US012206986B2

(12) United States Patent
Veit et al.

(10) Patent No.: US 12,206,986 B2
(45) Date of Patent: *Jan. 21, 2025

(54) AUTOMATED CAMERA MODE SELECTION

(71) Applicant: GoPro, Inc., San Mateo, CA (US)

(72) Inventors: Thomas Nicolas Emmanuel Veit, Meudon (FR); Sylvain Leroy, Bures-sur-yvette (FR); Heng Zhang, San Mateo, CA (US); Ingrid Cotoros, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,996

(22) Filed: Sep. 19, 2023

(65) Prior Publication Data

US 2024/0015397 A1    Jan. 11, 2024

Related U.S. Application Data

(63) Continuation of application No. 17/872,529, filed on Jul. 25, 2022, now Pat. No. 11,785,339, which is a
(Continued)

(51) Int. Cl.
*H04N 23/667* (2023.01)
*H04N 23/68* (2023.01)
(Continued)

(52) U.S. Cl.
CPC ......... *H04N 23/667* (2023.01); *H04N 23/681* (2023.01); *H04N 23/71* (2023.01); *H04N 23/741* (2023.01)

(58) Field of Classification Search
CPC .... H04N 23/667; H04N 23/681; H04N 23/71; H04N 23/741
See application file for complete search history.

(56) References Cited

U.S. PATENT DOCUMENTS 9,307,143 B2 *   4/2016   Sim ...................... H04N 23/667
9,357,127 B2 *   5/2016   Lameer ................. H04N 23/13
(Continued)

FOREIGN PATENT DOCUMENTS

CN         103516984 A   *   1/2014
CN         108391059 A       8/2018
GB           2508245         5/2014

OTHER PUBLICATIONS

International Preliminary Report on Patentability for App. No. PCT/US2019/035686, dated Apr. 1, 2021, 13 pages.
(Continued)

*Primary Examiner* — Ahmed A Berhan
(74) *Attorney, Agent, or Firm* — Young Basile Hanlon & MacFarlane, P.C.

(57) ABSTRACT

A camera mode to use for capturing an image or video is selected by estimating high dynamic range (HDR), motion, and light intensity with respect to a scene of the image or video to capture. An image capture device includes a HDR estimation unit to detect whether HDR is present in a scene of an image to capture, a motion estimation unit to determine whether motion is detected within the scene, and a light intensity estimation unit to determine whether a scene luminance for the scene meets a threshold. A mode selection unit selects a camera mode to use for capturing the image based on output of the HDR estimation unit, the motion estimation unit, and the light intensity estimation unit. An image sensor captures the image according to the selected camera mode.

20 Claims, 13 Drawing Sheets

Related U.S. Application Data continuation of application No. 17/277,430, filed as application No. PCT/US2019/035686 on Jun. 6, 2019, now Pat. No. 11,399,136.

(60) Provisional application No. 62/733,308, filed on Sep. 19, 2018.

(51) Int. Cl.
*H04N 23/71* (2023.01)
*H04N 23/741* (2023.01)

(56) References Cited

U.S. PATENT DOCUMENTS

| | | |
|---|---|---|
| 11,399,136 B2 | 7/2022 | Veit |
| 11,785,339 B2 | 10/2023 | Veit |
| 2010/0259636 A1 | 10/2010 | Tzur |
| 2015/0271405 A1* | 9/2015 | Lameer ............... H04N 23/741 348/222.1 |
| 2020/0068108 A1 | 2/2020 | Dai |
| 2021/0360157 A1 | 11/2021 | Veit |
| 2022/0360711 A1 | 11/2022 | Veit |

OTHER PUBLICATIONS

PCT Internation Search Report and Written Opinion for PCT/US2019/035686 dated Nov. 15, 2019, 18 pages.

* cited by examiner

AUTOMATED CAMERA MODE SELECTION

CROSS-REFERENCE TO RELATED APPLICATIONS

This application is a continuation of U.S. patent application Ser. No. 17/872,529, filed Jul. 25, 2022, which is a continuation of U.S. patent application Ser. No. 17/277,430, filed on Mar. 18, 2021, now U.S. Pat. No. 11,399,136, which is a 371 of International Application No. PCT/US2019/035686, filed on Jun. 6, 2019, which claims priority to U.S. Provisional Application No. 62/733,308, filed on Sep. 19, 2018, the entire contents of which are hereby incorporated by reference.

TECHNICAL FIELD

This disclosure relates to automated camera mode selection.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. The configurations used by the image sensor to capture the images or video may in some cases have an effect on the overall quality of the images or video. For example, different configurations may be used based on a particular camera mode selected for capturing the images or video.

SUMMARY

This disclosure describes, inter alia, systems and techniques for automated camera mode selection.

A first aspect of this disclosure is an image capture device for automated camera mode selection. The image capture device includes a high dynamic range (HDR) estimation unit configured to detect whether HDR is present in a scene of an image to capture based on one or more dynamic range inputs, a motion estimation unit configured to determine whether motion is detected within the scene based on one or more motion inputs, a light intensity estimation unit configured to determine whether a scene luminance for the scene meets a thresholds based on one or more light intensity inputs, a mode selection unit configured to select a camera mode to use for capturing the image based on output of the HDR estimation unit, the motion estimation unit, and the light intensity estimation unit, and an image sensor configured to capture the image according to the selected camera mode. In an implementation, the operations performed by the HDR estimation unit, the motion estimation unit, and the light intensity estimation unit are continuously performed until user input indicating to capture the image is received. In an implementation, the image capture device further includes a temporal smoothing unit configured to perform temporal smoothing filtering against the outputs from the HDR estimation unit, from the motion estimation unit, and from the light intensity estimation unit, where the mode selection unit is configured to select the camera mode based on an output of the temporal smoothing filtering. In an implementation, the HDR estimation unit is configured to detect whether HDR is present in the scene of the image based on spatial information. In an implementation, the outputs of the HDR estimation unit, the motion estimation unit, and the light intensity estimation unit comprise fuzzy values, where the mode selection unit is configured to select the camera mode by defuzzifying the fuzzy values. In an implementation, the selected camera mode is used for capturing a second image responsive to a determination that a scene of the image is similar to a scene of the second image. In an implementation, the selected camera mode is used for capturing a second image responsive to a determination that a difference between a first time at which the image is captured and a second time at which user input indicating to capture the second image is received meets a threshold. In an implementation, the HDR estimation unit is configured to detect whether HDR is present in the scene of the image based on a number of dark pixels and a number of bright pixels. In an implementation, the motion estimation unit is configured to determine whether motion is detected based on an angular speed. In an implementation, the motion estimation unit is configured to determine whether motion is detected based on a Sum of Absolute Differences (SAD) between current and previous thumbnails when the angular speed is below a first threshold. The first aspect may include any combination of the features described in this paragraph and in the paragraphs of the second aspect and the third aspect.

A second aspect of this disclosure is an imaging system. The imaging system includes a processor and an image sensor connected to the processor. The processor is configured to determine a high dynamic range (HDR) level in a scene of a to be captured image based on a number of dark pixels and a number of bright pixels, determine a motion level within the scene based on motion inputs, determine a scene luminance level based on light intensity inputs, and automatically select a camera mode based on a combination of the HDR level, the motion level, and the scene luminance level. The image sensor is configured to capture the image according to the selected camera mode. In an implementation, the HDR level is based on a sum of the number of dark pixels and the number of bright pixels. In an implementation, the HDR level is based on a difference between a sum of the number of dark pixels and the number of bright pixels, and a product of the number of dark pixels and the number of bright pixels. In an implementation, the processor is further configured to determine a value type for the HDR level, for the motion level, and for the scene luminance level, and apply fuzzy inference rules to the value types to select the camera mode. In an implementation, the fuzzy inference rules are a three-dimensional decision cube with a motion axis, a HDR axis, and a light intensity axis. In an implementation, the processor is further configured to apply spatial information to the number of dark pixels and the number of bright pixels to determine the HDR level. In an implementation, the light intensity inputs are exposure values. The second aspect may include any combination of the features described in this paragraph and in the paragraphs of the first aspect and the third aspect.

A third aspect of this disclosure is a method for automated camera mode selection. The method includes determining high dynamic range (HDR) presence in a scene of an image to capture, detecting motion presence within the scene, determining scene luminance for the scene, automatically selecting a camera mode based on outputs from the HDR presence determination, motion presence detection, and scene luminance determination, and capturing the image using the selected camera mode. In an implementation, the method further includes performing the determining the HDR presence, performing the detecting the motion presence, and performing the determining scene luminance continuously until the image is captured. In an implementation, the method further includes applying temporal smoothing to the outputs and applying median filtering to the selected camera mode. The third aspect may include any combination of the features described in this paragraph and in the paragraphs of the first aspect and the second aspect.

These and other aspects of the present disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
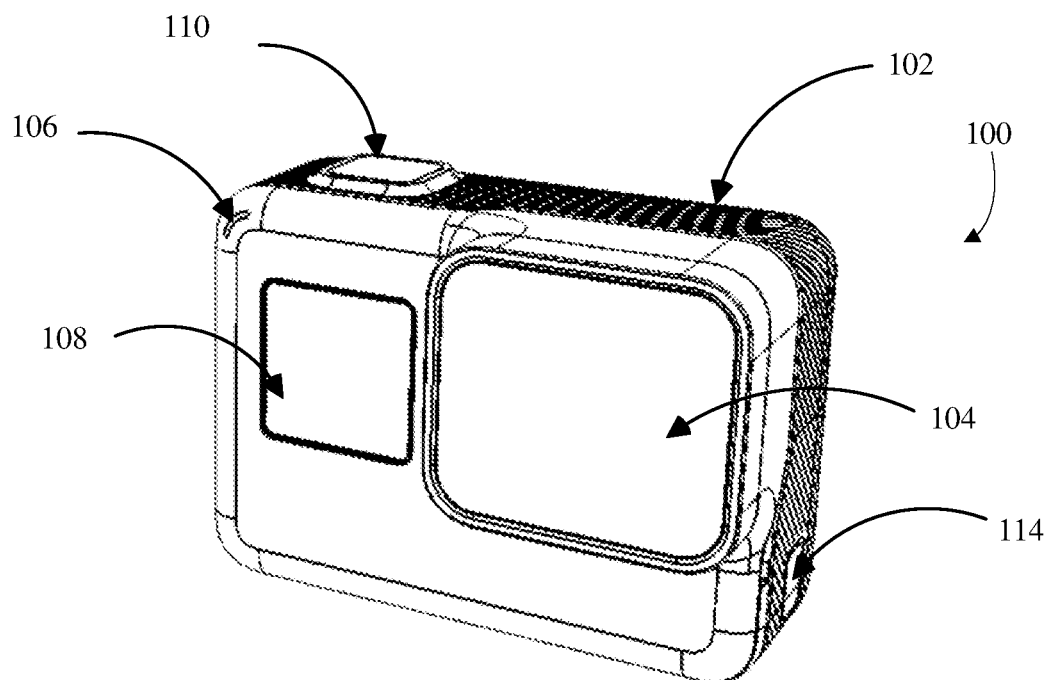
FIGS. 1A-D are isometric views of an example of an image capture device.
Figure 1B:
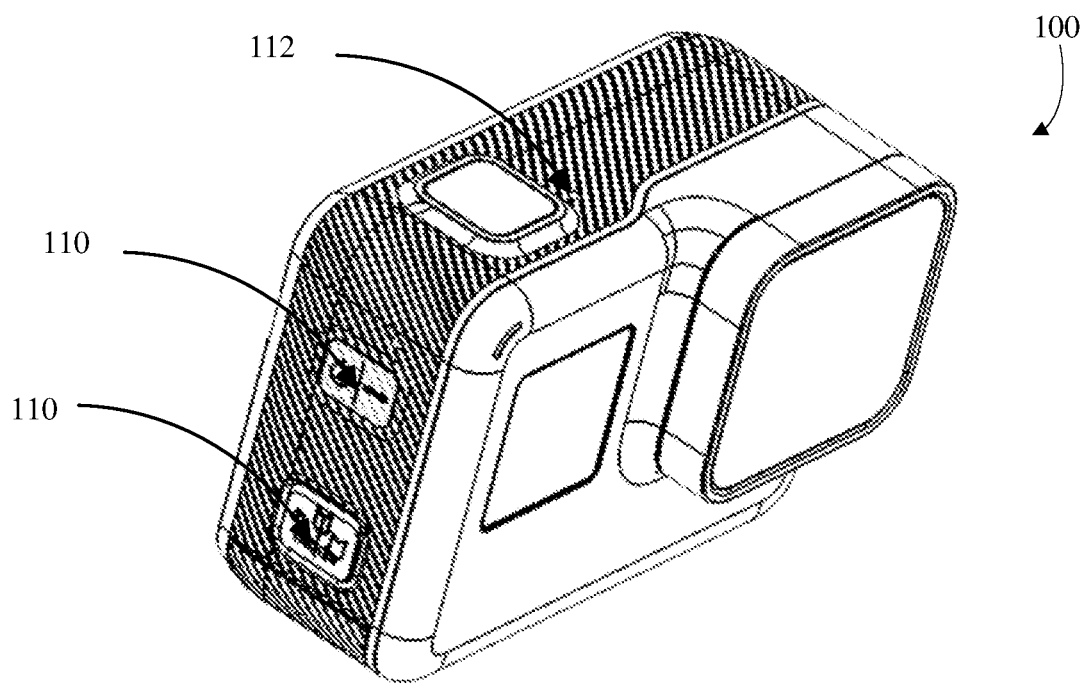
Figure 1C:
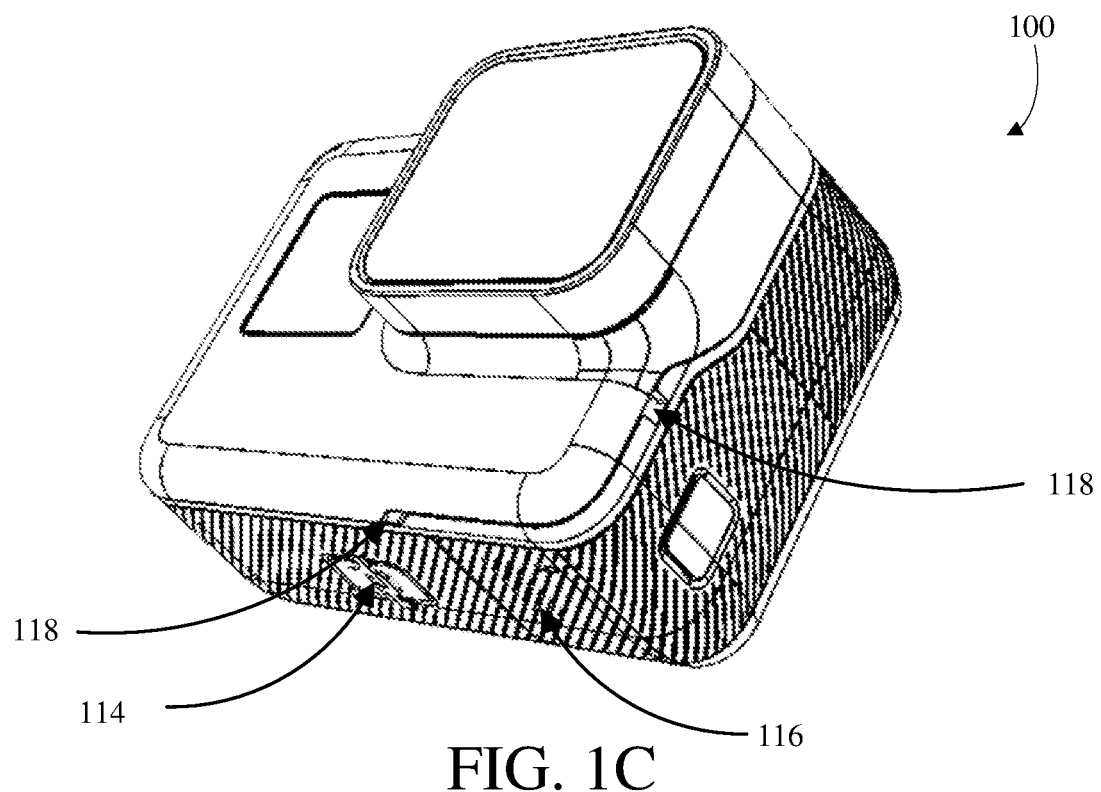
Figure 1D:
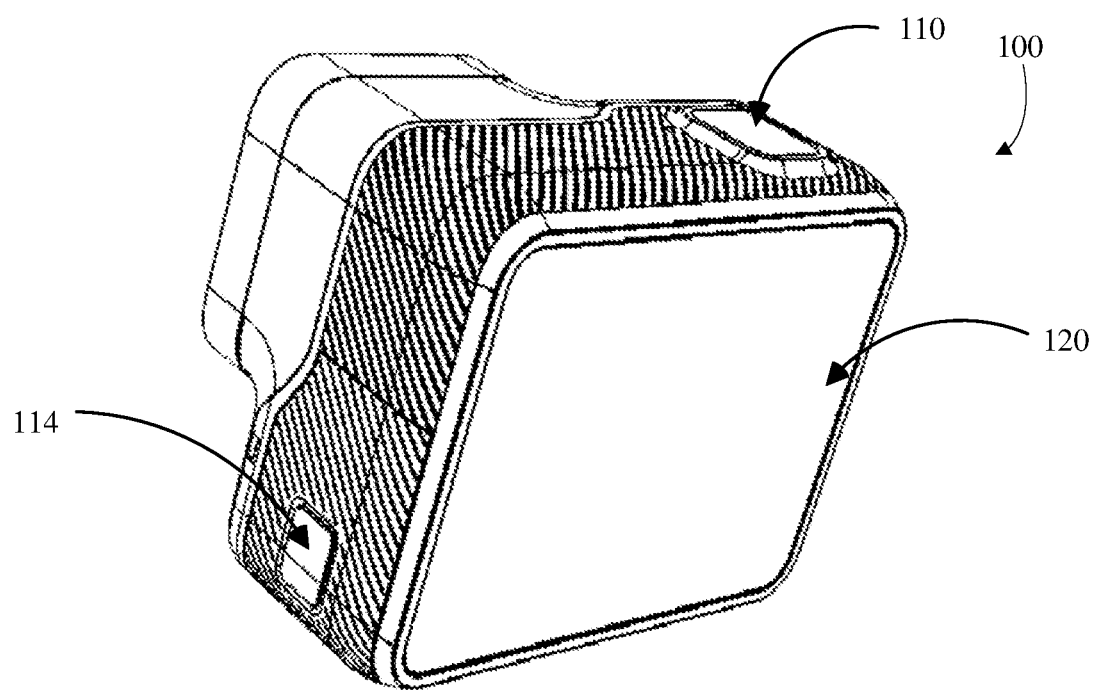

An image capture device may capture the image according to image capture configurations of a selected camera mode. For example, a user of the image capture device may select a camera mode to use to capture the image. The selection may be based on one or more criteria including, for example, an amount of background light, a location of a subject relative to the image sensor, or a motion of the subject. Examples of camera modes that may be available for selection include, without limitation, a still mode, still+ local tone mapping (LTM) mode, high dynamic range (HDR) mode, and multi-frame noise reduction (MFNR) mode.

Each of those camera modes may be best suited for particular situations. For example, the still+LTM mode may be preferable where there is low to mid (e.g., 100 to 800) ISO, with or without motion, and a low amount of noise. In another example, the HDR mode may be preferable where there is low to mid ISO, the location of the image to capture is somewhere outdoors, motion is detected up to a certain degree (small motion), and low noise. In yet another example, the MFNR mode may be preferable where there is high (e.g., more than 800) ISO, up to a certain noise level, and without too much motion. The highest quality image or video may result from using the most preferable camera mode given the situation.

In many cases, the user of the image capture device may not select the best camera mode to use at a given time or in a given place. For example, the user may not recognize that the background of an image to capture does not have enough light for a selected mode or that an object to be captured within the image has a motion that may not be captured very well using a selected mode. Furthermore, even if the user of the image capture device selects an appropriate camera mode for capturing a first image, that camera mode may not be the best camera mode for capturing a subsequent image. That is, lighting, motion, or other conditions within a location in which the images are captured may change over a short amount of time. If the user does not account for these changes and select a new camera mode, the subsequently-captured image may be low quality.

Implementations of this disclosure address problems such as these using automated camera mode selection systems and techniques. The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LED display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114. The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100 includes a camera exterior that encompasses and protects the camera's internal electronics, which are further described in later sections. The camera exterior includes six surfaces (i.e. a front face, a left face, a right face, a back face, a top face, and a bottom face), wherein the exterior surfaces form a rectangular cuboid. Furthermore, both the front and rear surfaces of the image capture device 100 are substantially rectangular in shape. The image capture device 100 can be made of a rigid material such as plastic, aluminum, steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as a multiple microphone openings to receive voice or other audio commands.

Although not expressly shown in FIGS. 1A-D, in some implementations, the image capture devices 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, in some implementations, the image capture device 100 may include one or more microphones, which may receive, capture, and record audio information, which may be associated with images acquired by the image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

Figure 3:
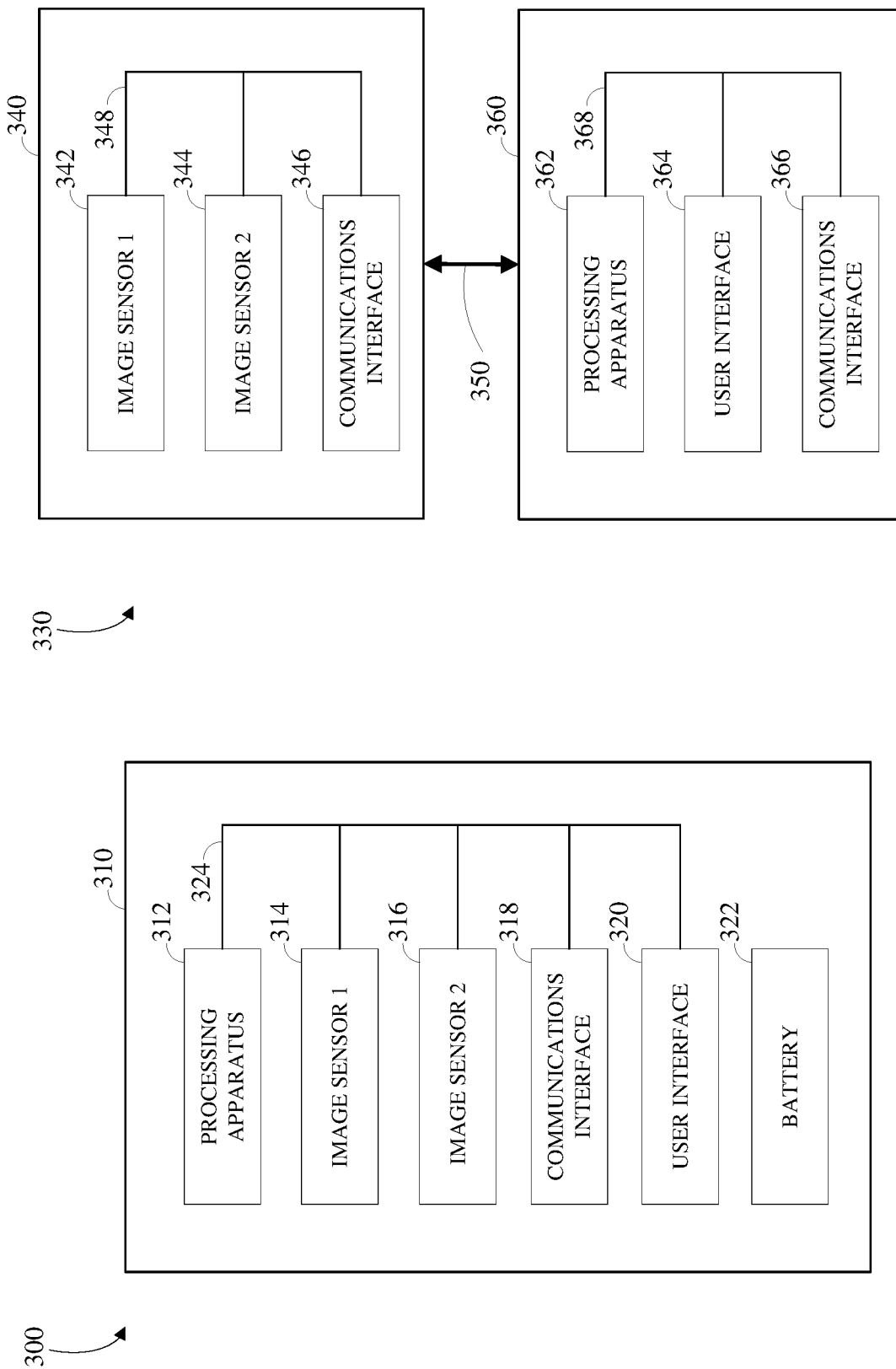
FIGS. 3A-B are block diagrams of examples of systems configured for image capture.

In some implementations, the image capture device 100 may interface with or communicate with an external device, such as an external user interface device, via a wired or wireless computing communication link (not shown). The user interface device may, for example, be the personal computing device 360 described below with respect to FIG. 3. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the image capture device 100 may transmit images, such as panoramic images, or portions thereof, to the user interface device (not shown) via the computing communication link, and the user interface device may store, process, display, or a combination thereof the panoramic images.

In some implementations, the user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

In some implementations, the user interface device may display, or otherwise present, content, such as images or video, acquired by the image capture device 100. For example, a display of the user interface device may be a viewport into the three-dimensional space represented by the panoramic images or video captured or created by the image capture device 100.

In some implementations, the user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

In some implementations, the user interface device may implement or execute one or more applications to manage or control the image capture device 100. For example, the user interface device may include an application for controlling camera configuration, video acquisition, video display, or any other configurable or controllable aspect of the image capture device 100.

In some implementations, the user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

In some implementations, the user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

In some implementations, the user interface device, such as via an application, may display, or otherwise present, marks or tags associated with images or video, such as in response to user input. For example, marks may be presented in a camera roll application for location review and/or playback of video highlights.

In some implementations, the user interface device, such as via an application, may wirelessly control camera software, hardware, or both. For example, the user interface device may include a web-based graphical interface accessible by a user for selecting a live or previously recorded video stream from the image capture device 100 for display on the user interface device.

In some implementations, the user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
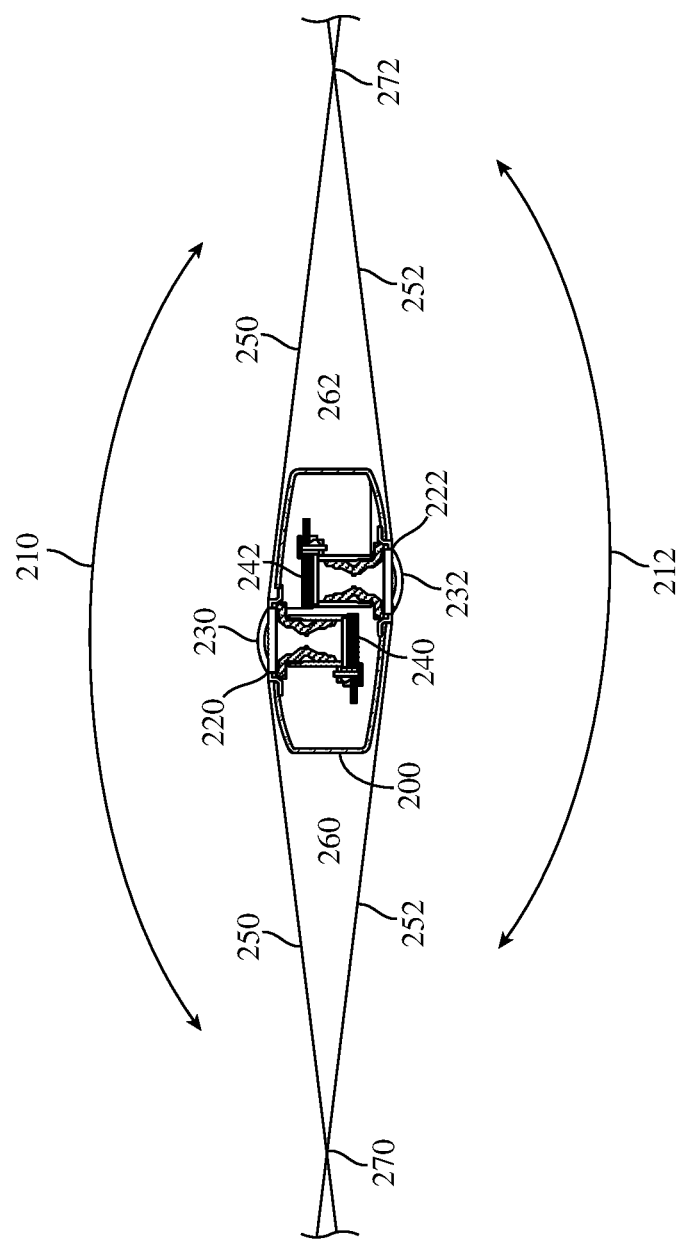
FIG. 2 is a cross-sectional view of an example of an image capture device including overlapping fields-of-view.

FIG. 2 is a cross-sectional view of an example of a dual-lens image capture device 200 including overlapping fields-of-view 210, 212. In some implementations, the image capture device 200 may be a spherical image capture device with fields-of-view 210, 212 as shown in FIG. 2. For example, the image capture device 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240.

The first lens 230 of the image capture device 200 may have the field-of-view 210 shown above a boundary 250. Behind the first lens 230, the first image sensor 240 may capture a first hyper-hemispherical image plane from light entering the first lens 230, corresponding to the first field-of-view 210.

The second lens 232 of the image capture device 200 may have a field-of-view 212 as shown below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232, light may be obscured from the lenses 230, 232 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 230, 232, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 230, 232 and the image sensors 240, 242 such that the fields-of-view 210, 212, stitch points 270, 272, or both may be accurately determined, which may improve the accuracy, efficiency, or both of generating a combined image.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 230, 232 may include substantially reduced thickness relative to the lengths of the lens barrels securing the lenses 230, 232. For example, the overall thickness of the image capture device 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or frames captured by an image capture device, such as the image capture device 100 shown in FIGS. 1A-D or the image capture device 200 shown in FIG. 2, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of systems configured for image capture. Referring first to FIG. 3A, an image capture device 300 configured for image capture is shown. The image capture device 300 includes an image capture device 310 (e.g., a camera or a drone), which may, for example, be the image capture device 100 shown in FIGS. 1A-D. The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316.

The image capture device 310 includes a communications interface 318 for transferring images to other devices. The image capture device 310 includes a user interface 320, which may allow a user to control image capture functions and/or view images. The image capture device 310 includes a battery 322 for powering the image capture device 310. The components of the image capture device 310 may communicate with each other via the bus 324.

Figure 4:
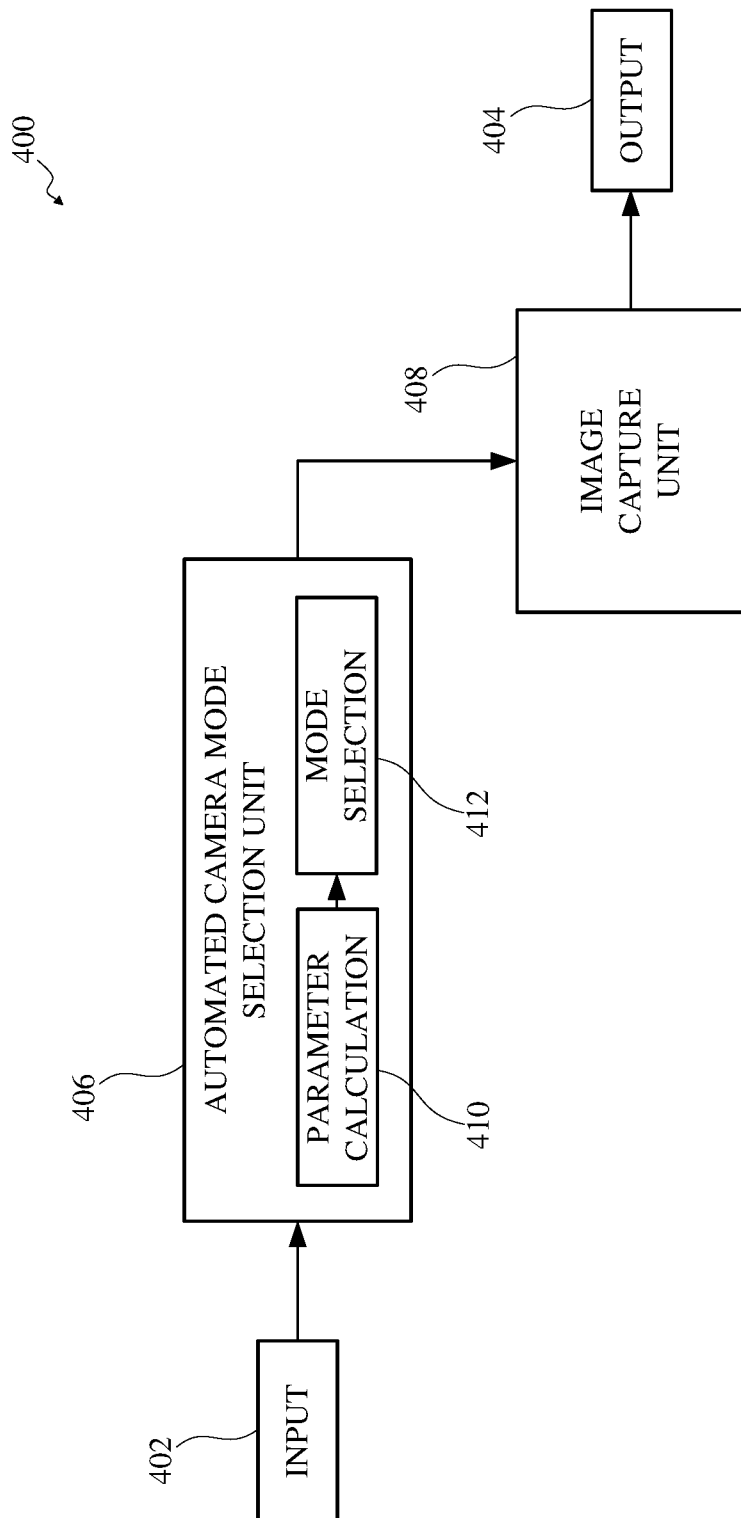
FIG. 4 is a block diagram of an example of a camera mode selection and capture pipeline.
Figure 6:
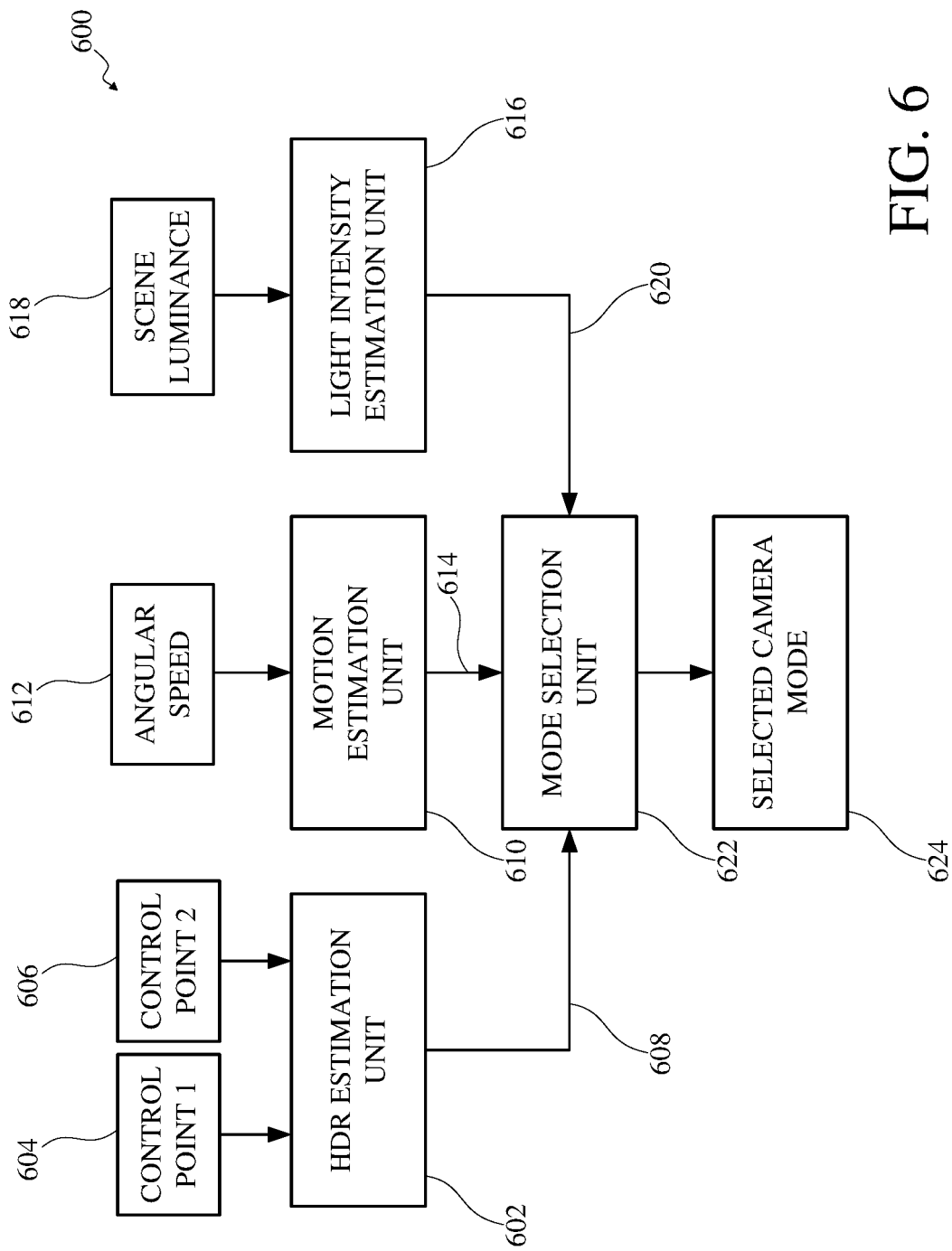
FIGS. 6-11 are block diagrams of examples of pipelines for different automated camera mode selection techniques according to this disclosure.
Figure 7:
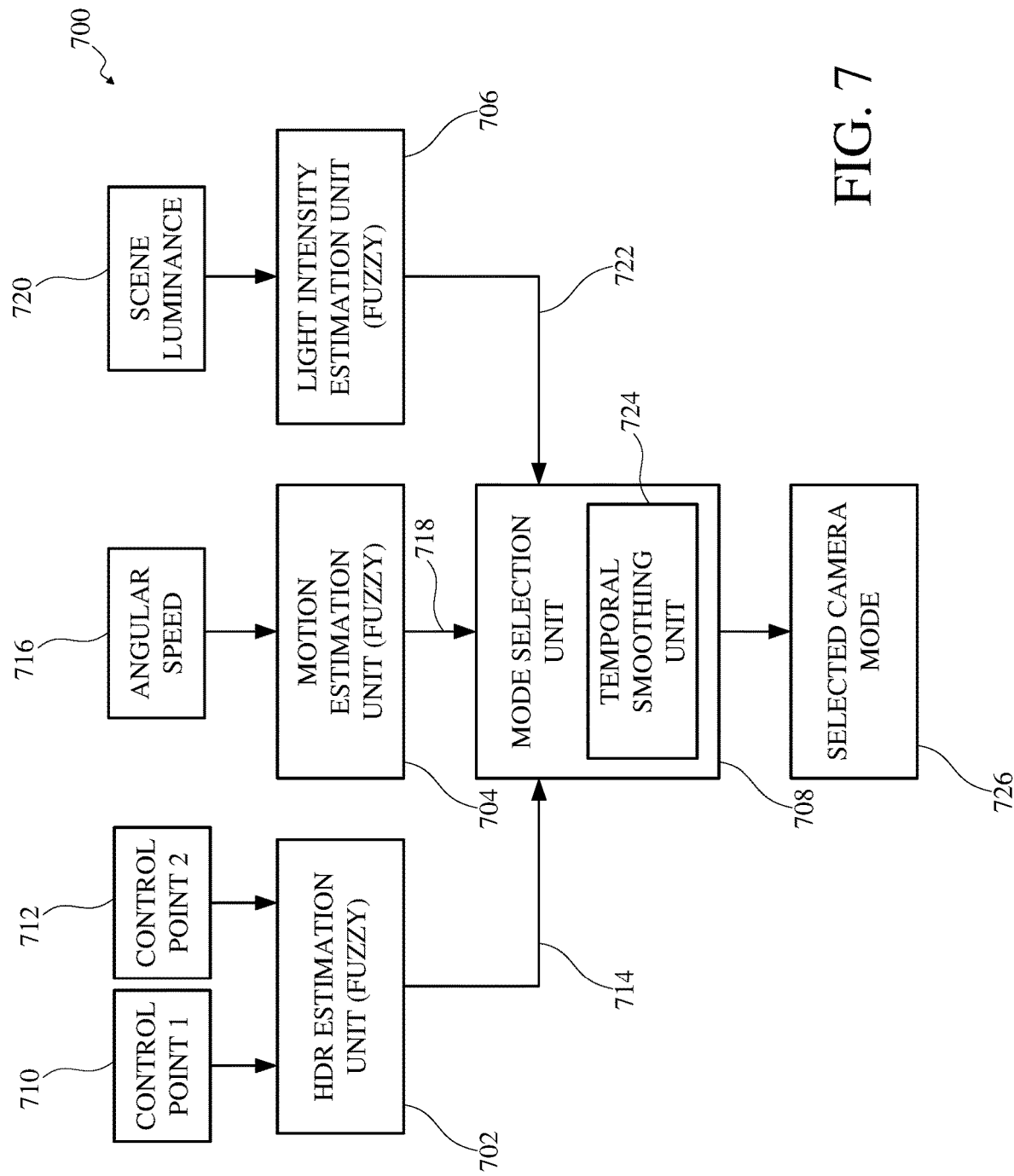
Figure 8:
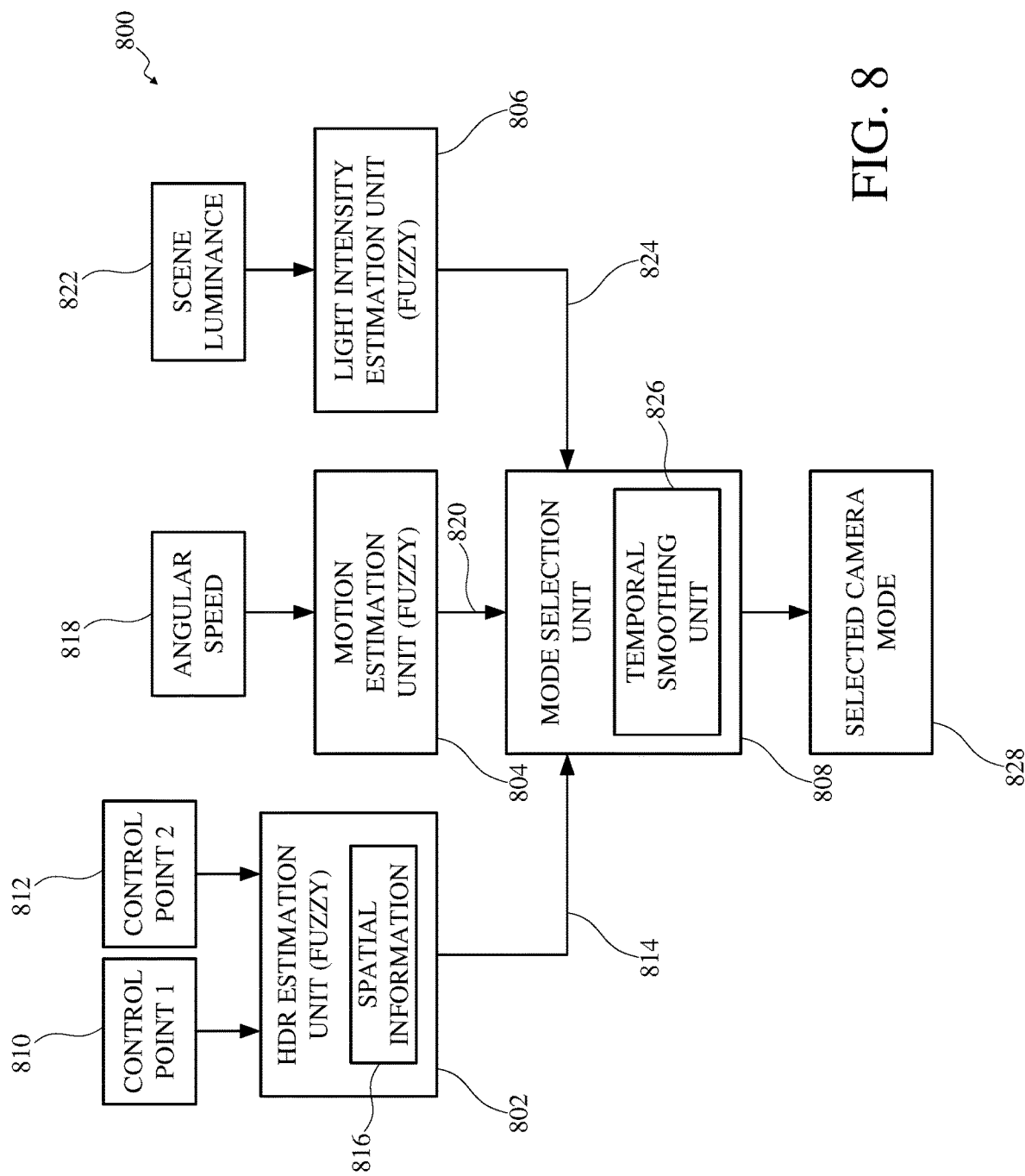
Figure 9:
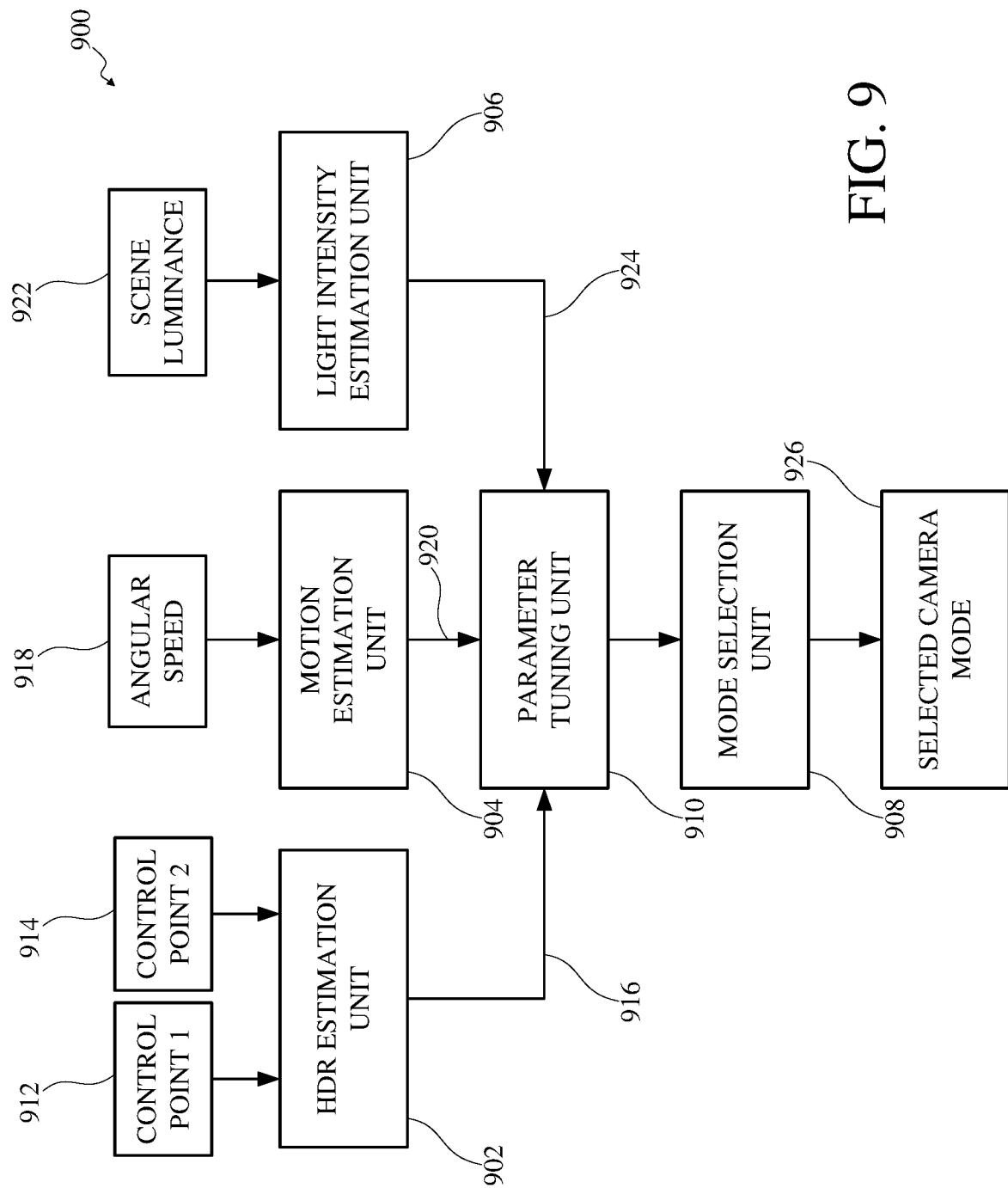
Figure 10:
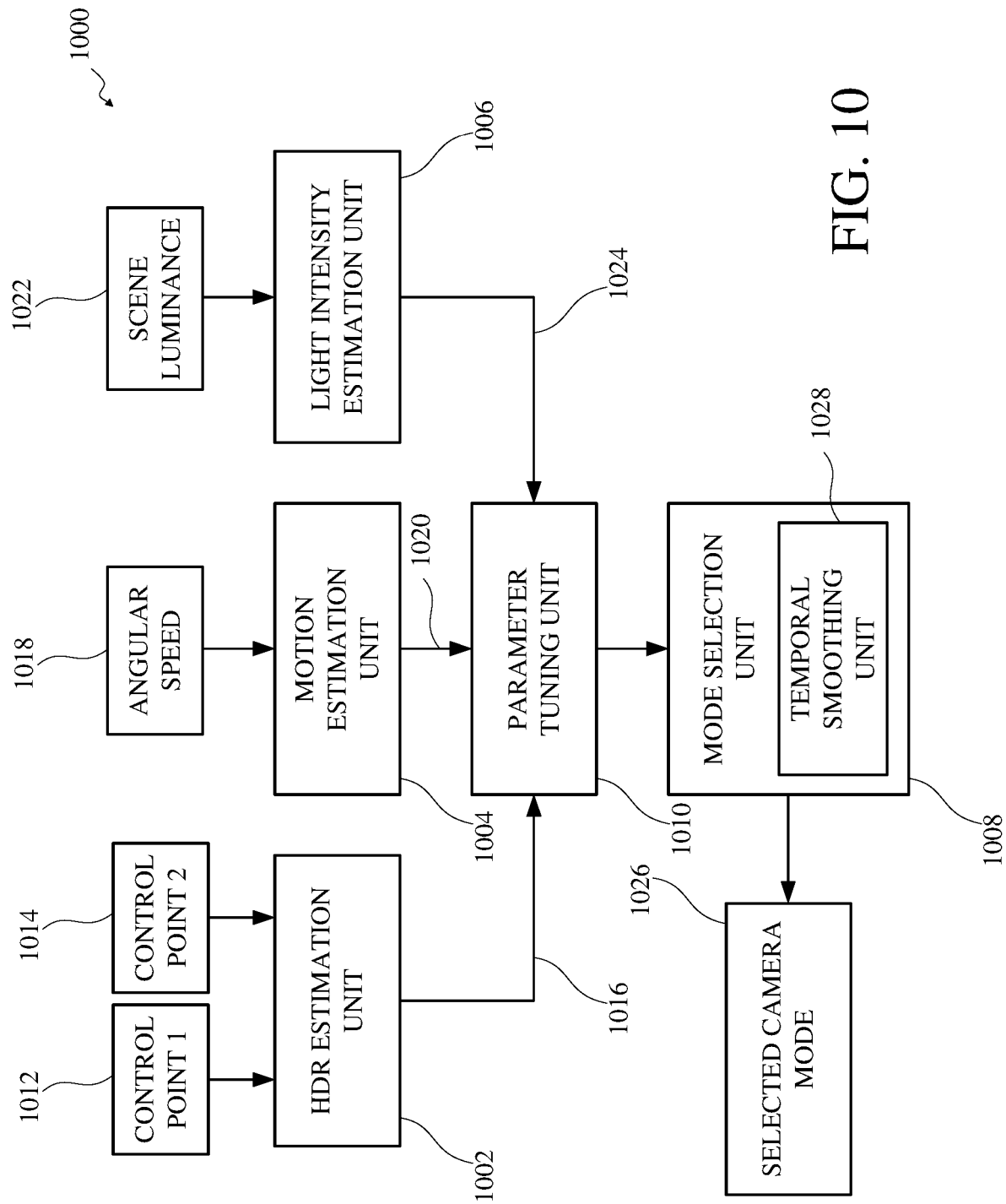
Figure 11:
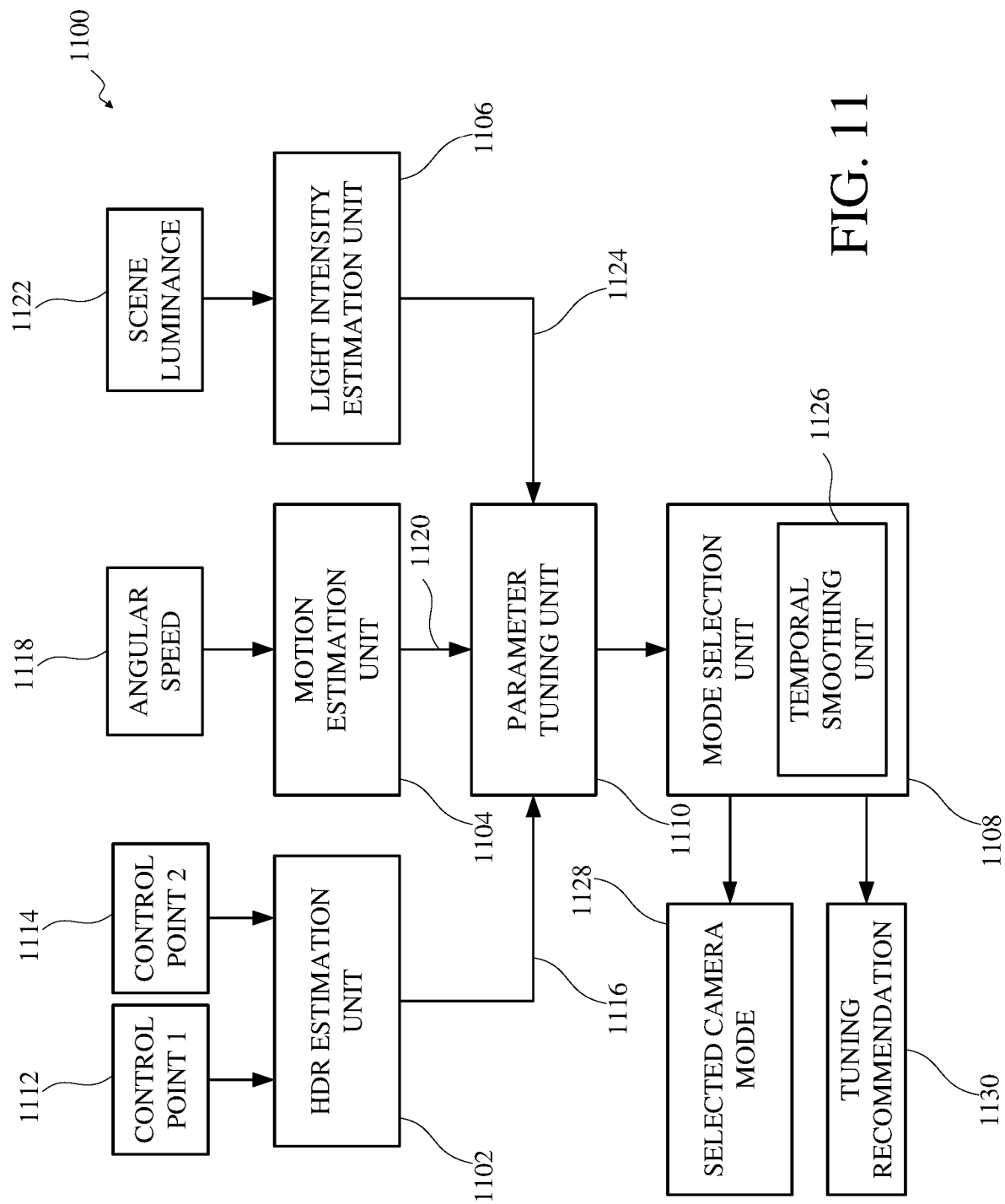

The image capture device 300 may implement some or all of the pipelines for automated camera mode selection described in this disclosure, such as the pipeline 400 of FIG. 4, the pipeline 600 of FIG. 6, the pipeline 700 of FIG. 7, the pipeline 800 of FIG. 8, the pipeline 900 of FIG. 9, the pipeline 1000 of FIG. 10, the pipeline 1100 of FIG. 11, or a combination thereof. The image capture device 300 may be used to implement some or all of the techniques described in this disclosure, such as the technique 1200 of FIG. 12.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 are configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The image capture device 310 may include a communications interface 318, which may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. The image capture device 310 may include a battery 322 that powers the image capture device 310 and/or its peripherals. For example, the battery 322 may be charged wirelessly or through a micro-USB interface.

In some implementations, the image capture device 310 may include one or more hardware or software components for performing global tone mapping against pixels of an image captured using the image capture device 310. The global tone mapping performed using those one or more hardware or software components may integrate color correction operations. For example, those one or more hardware or software components may be used to perform the technique 1200 described below with respect to FIG. 12.

Referring next to FIG. 3B, a system 330 configured for image capture is shown. The system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D. The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor, and receive a second image from the second image sensor 344. The processing apparatus 362 may be configured to perform image signal processing (e.g., filtering, tone mapping, stitching, and/or encoding) to generate output images based on image data from the image sensors 342 and 344.

The image capture device 340 may implement some or all of the pipelines for automated camera mode selection described in this disclosure, such as the pipeline 400 of FIG. 4, the pipeline 600 of FIG. 6, the pipeline 700 of FIG. 7, the pipeline 800 of FIG. 8, the pipeline 900 of FIG. 9, the pipeline 1000 of FIG. 10, the pipeline 1100 of FIG. 11, or a combination thereof. The image capture device 340 may be used to implement some or all of the techniques described in this disclosure, such as the technique 1200 of FIG. 12.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via the bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

In some implementations, the image capture device 340 and/or the personal computing device 360 may include one or more hardware or software components for performing global tone mapping against pixels of an image captured using the image capture device 340. The global tone mapping performed using those one or more hardware or software components may integrate color correction operations. For example, those one or more hardware or software components may be used to perform the technique 1200 described below with respect to FIG. 12.

FIG. 4 is a block diagram of an example of a camera mode selection and capture pipeline 400. In some implementations, the camera mode selection and capture pipeline 400 may be included in an image capture device, such as the image capture device 100 shown in FIGS. 1A-D or the image capture device 200 shown in FIG. 2. In some implementations, the camera mode selection and capture pipeline 400 may represent functionality of an integrated circuit, for example, including an image capture unit, a camera mode selection unit, or a combined camera mode selection and image capture unit.

The camera mode selection and capture pipeline 400 receives input 402 and processes the input 402 to produce output 404. The input 402 may be information or measurements usable to select a camera mode at an automated camera mode selection unit 406. For example, the input 402 may include measurements related to criteria processed by the automated camera mode selection unit 406, such as dynamic range, motion, and/or light intensity. The input 402 may be received using one or more sensors of the image capture device or processor implementing the camera mode selection and capture pipeline 400.

The output 404 may be an image captured using an image capture unit 408. The image capture unit 408 uses the camera mode selected by the automated camera mode selection unit 406 to capture an image, such as using an image sensor (e.g., the first image sensor 314 and/or the second image sensor 316, or the first image sensor 342 and/or the second image sensor 344). For example, the image captured using the image capture unit 408 may be an image or a frame of a video. That image or frame may be one of a sequence or series of images or frames of a video, such as a sequence, or series, of frames captured at a rate, or frame rate, which may be a number or cardinality of frames captured per defined temporal period, such as twenty-four, thirty, or sixty frames per second. The output 404 may be output for display at the image capture device and/or transmitted to another component or device.

The automated camera mode selection unit 406 includes a parameter calculation unit 410 and a mode selection unit 412. The parameter calculation unit 410 processes the input 402 to determine values for the image selection criteria represented within the input 402. The parameter calculation unit 410 outputs those values or data indicative thereof to the mode selection unit 412. The mode selection unit 412 selects a camera mode to use to capture an image based on those values or data. In some implementations, the mode selection unit 412 may select the camera mode based at least in part on secondary input 414.

In some implementations, the automated camera mode selection unit 406 may include additional units or functionality. In some implementations, the parameter calculation unit 410 and the mode selection unit 412 may be combined into one unit. In some implementations, aspects of one or both of the parameter calculation unit 410 or the mode selection unit 412 may be separated into multiple units.

Figure 5:
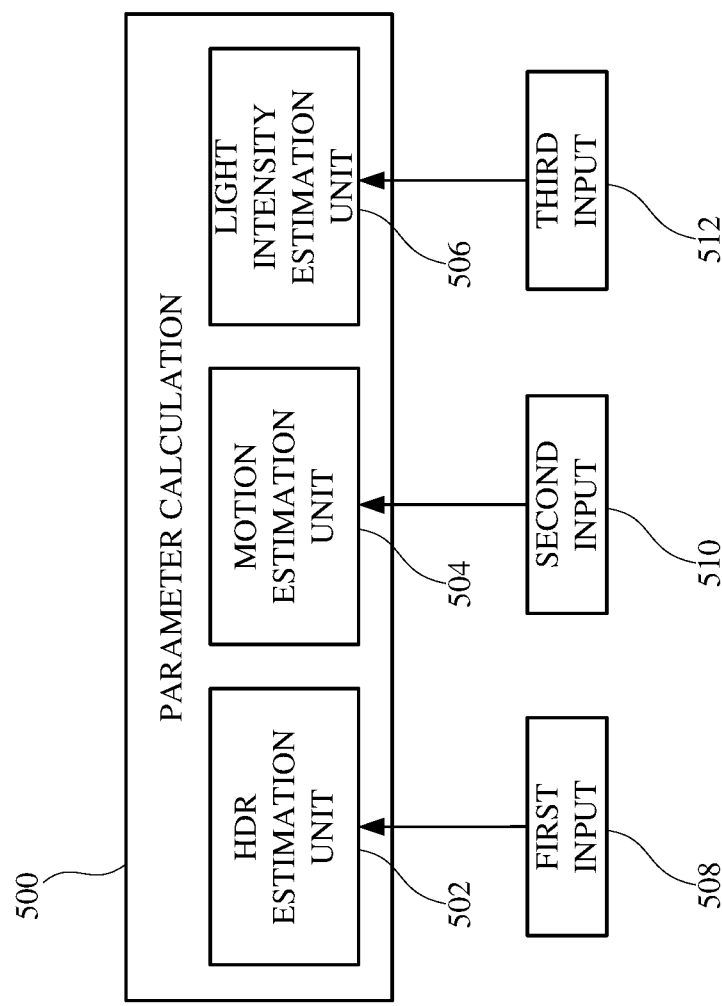
FIG. 5 is a block diagram of an example of a parameter calculation unit of an automated camera mode selection unit of an image capture device.

FIG. 5 is a block diagram of an example of a parameter calculation unit 500 of an automated camera mode selection unit of an image capture device. For example, the parameter calculation unit 500 may be the parameter calculation unit 410 of the pipeline 400 described with respect to FIG. 4. The parameter calculation unit 500 includes a HDR estimation unit 502, a motion estimation unit 504, and a light intensity estimation unit 506. The HDR estimation unit 502 estimates dynamic range for an image to be captured using first input 508. The motion estimation unit 504 estimates motion for the image to be captured using second input 510. The light intensity estimation unit 506 estimates light intensity for the image to be captured using third input 512.

Some or all of the first input 508, the second input 510, or the third input 512 may be included within input received at the automated camera mode selection unit that implements the parameter calculation unit 500. For example, some or all of the first input 508, the second input 510, or the third input 512 may be received within the input 402 described with respect to FIG. 4. In some implementations, some or all of the first input 508, the second input 510, or the third input 512 may refer to the same or similar information or measurements.

The HDR estimation unit 502 uses the first input 508 to determine whether a scene for the image to be captured is HDR or non-HDR. The HDR estimation unit 502 determines that the scene for the image to be captured is non-HDR if the first input 508 indicates that the image sensor of the image capture device will be able to capture the entire information of the scene without resulting in dark or saturated pixels. Similarly, the HDR estimation unit 502 determines that the scene for the image to be captured is HDR if there are at least a threshold number of dark pixels and a threshold number of bright pixels. Those threshold numbers may be the same or different. As such, the HDR estimation unit 502 processes the first input 508 to determine a number of dark pixels and a number of bright pixels.

The motion estimation unit 504 uses the second input 510 to determine whether camera motion is detected. For example, the motion estimation unit 504 can determine whether sensor measurements (e.g., angular speed) indicated within the second input 510 meets a motion threshold. If the motion threshold is met (e.g., because the angular speed is higher than a value for the motion threshold), the motion estimation unit 504 determines that camera motion is detected.

The light intensity estimation unit 506 uses the third input 512 to determine a light intensity for the scene for the image to be captured. Thus, the light intensity may be estimated based on data representing the scene luminance within the third input 512. As such, the light intensity estimation unit 506 may determine the light intensity for the scene based on a light intensity threshold. For example, the light intensity estimation unit 506 may determine that the light intensity is low where the scene luminance is below the light intensity threshold. In another example, the light intensity estimation unit 506 may determine that the light intensity is high where the scene luminance is higher than the light intensity threshold. In yet another example, the light intensity estimation unit 506 may determine that the light intensity is medium where the scene luminance is neither lower nor higher than the light intensity threshold.

Implementations and examples of automated camera mode selection according to this disclosure may use different inputs for the parameter calculations described with respect to FIGS. 4 and 5 and/or perform different processing than as described with respect to FIGS. 4 and 5. In particular, FIGS. 6-11 are block diagrams of examples of pipelines for different automated camera mode selection techniques according to this disclosure.

Referring first to FIG. 6, a pipeline 600 used to implement a first technique for automated camera mode selection is shown. According to the first technique, a HDR estimation unit 602 (e.g., the HDR estimation unit 502 described with respect to FIG. 5) receives two input values 604 and 606 (e.g., the first input 508 described with respect to FIG. 5). The two input values 604 and 606 refer to control points defined using one or more look up tables (LUTs). Each of the two input values 604 and 606 is compared to a threshold. In some cases, both of the two input values 604 and 606 may be compared to the same threshold.

In particular, the two input values 604 and 606 represent control points used to define what a dark pixel is and what a bright pixel is. A first LUT corresponding to the first input value 604 corresponds to a first curve for the image and a second LUT corresponding to the second input value 606 corresponds to a second curve for the image. The first curve of the first LUT and the second curve of the second LUT are weighting curves. The weighting curves are exponential functions between 0.0 and 1.0. These curves are vectors (the LUTs) of 256 values. On the other hand, the 64×48 thumbnail is represented using 16 bits. Each pixel value of the thumbnail is transformed to an 8 bits value. This 8 bits value is the index for the LUTs, i.e., Score_bright=LUT_bright[8bits_value] and Score_dark=LUT_dark[8bits_value], for example. That is, each curve (an exponential function) is parametrized by one control point (tuning parameter). The transformation to 8 bits is done for all pixels of the thumbnail and all the scores are summed. These scores are then normalized to get $F_{Dark}$ and $F_{Bright}$.

Thus, the HDR estimation unit 602 determines whether a scene for the image to be captured is HDR based on where the two input values 604 and 606 are with respect to the weighting curves. The HDR estimation unit 602 outputs an indicator 608 as a result of that determination. The indicator 608 is a Boolean in which a first value (e.g., true) indicates that the HDR estimation unit 602 determined the scene to be HDR and in which a second value (e.g., false) indicates that the HDR estimation unit 602 determined the scene to be non-HDR.

The motion estimation unit 610 (e.g., the motion estimation unit 504 described with respect to FIG. 5) receives one input value 612 (e.g., the second input 510 described with respect to FIG. 5) representing an angular speed of an object detected using a gyroscope or other sensor. The motion estimation unit 610 determines whether the input value 612 is higher than a first threshold. If the input value 612 is higher than the first threshold, the motion estimation unit 610 determines that camera motion is detected.

If the input value 612 is not higher than the first threshold, a Sum of Absolute Differences (SAD) is determined between the current and the previous thumbnails. If the SAD is higher than a second threshold, the motion estimation unit 610 determines that scene motion is detected. If the SAD is not higher than the second threshold, the motion estimation unit 610 determines that no motion is detected. The motion estimation unit 610 outputs an indicator 614 as a result of the one or two determinations. The indicator 614 is a Boolean in which a first value (e.g., true) indicates that the motion estimation unit 610 detected some motion and in which a second value (e.g., false) indicates that the motion estimation unit 610 did not detect motion.

The light intensity estimation unit 616 (e.g., the light intensity estimation unit 506 described with respect to FIG. 5) receives one input value 618 (e.g., the third input 512 described with respect to FIG. 5) representing a scene luminance estimated within exposure correction operations. The input value 618 is compared against a threshold for light intensity. If the input value 618 is greater than the threshold, the light intensity estimation unit 616 determines that the light intensity is high. If the input value 618 is less than the threshold, the light intensity estimation unit 616 determines that the light intensity is low. If the input value 618 is neither greater nor less than the threshold, the light intensity estimation unit 616 determines that the light intensity is medium.

The light intensity estimation unit 616 outputs an indicator 620 based on the comparison between the input value 618 and the threshold. For example, the indicator can have a first value when the light intensity is determined to be high, a second value when the light intensity is determined to be low, and a third value when the light intensity is determined to be medium.

A mode selection unit 622 (e.g., the mode selection unit 412 described with respect to FIG. 4) selects a camera mode to use to capture an image based on the indicator 608, the indicator 614, and the indicator 620. For example, each of the camera modes that may be selected may be defined to correspond to particular combinations of values of the indicator 608, the indicator 614, and the indicator 620. As such, the particular combination of values of the indicator 608, the indicator 614, and the indicator 620 may be used to identify one of the camera modes. As a result, a selected camera mode 624 is selected. The selected camera mode 624 may then be used, such as by an image capture unit (e.g., the image capture unit 408 described with respect to FIG. 4), to capture an image.

Referring next to FIG. 7, a pipeline 700 used to implement a second technique for automated camera mode selection is shown. The second technique implemented using the pipeline 700 represents an extension of the first technique implemented using the pipeline 600 described with respect to FIG. 6. The second technique addresses temporal instability (e.g., output flickering) that may result from using the threshold values to produce the indicator 608 as output of the HDR estimation unit 602 and to produce the indicator 614 as output of the motion estimation unit 610. In particular, the second technique introduces fuzzy logic to improve the behavior and the robustness of the automated camera mode selection process, and further introduces temporal smoothing filtering in which inputs are smoothed.

The pipeline 700 includes an HDR estimation unit 702, a motion estimation unit 704, a light intensity estimation unit 706, and a mode selection unit 708 (which may, for example, be the HDR estimation unit 502, the motion estimation unit 504, and the light intensity estimation unit 506 described with respect to FIG. 5, and the mode selection unit 412 described with respect to FIG. 4). The output of each of the HDR estimation unit 702, the motion estimation unit 704, and the light intensity estimation unit 706 is expressed as a fuzzy value between 0.0 and 1.0. The mode selection unit 708 processes the fuzzy values output from each of the HDR estimation unit 702, the motion estimation unit 704, and the light intensity estimation unit 706. In particular, the mode selection unit generally performs fuzzification against the fuzzy values received as input, evaluates the fuzzy values in view of rules, aggregates the output of those rules, and performs defuzzification against the aggregated output.

According to the second technique, the HDR estimation unit 702 receives two input values 710 and 712 (e.g., the first input 508 described with respect to FIG. 5). Processing is performed similar to that described with respect to the HDR estimation unit 602 of the pipeline 600 described with respect to FIG. 6. In particular, the sum of dark pixels ($F_{Dark}$) is determined and the sum of bright pixels ($F_{Bright}$) is determined, using one or more dedicated weighting functions. The sums $F_{Dark}$ and $F_{Bright}$ are then normalized to determine an output 714 as a fuzzy value FHDR.

Where an AND condition is used for the HDR detection, such that whether HDR is detected is based on the sum of both of the dark pixels and the bright pixels, the output 714 is calculated by $F_{Dark}$ and $F_{Bright}$. Alternatively, where an OR condition is used for the HDR detection, such that whether HDR is detected is based on the sum of the dark pixels or the sum of the bright pixels, the output 714 is calculated as the difference of a first value and a second value, where the first value represents the sum of $F_{Dark}$ and $F_{Bright}$ and the second value represents the product of $F_{Dark}$ and $F_{Bright}$. In some implementations, instead of two sums, a single sum of the mid-tone pixels may instead be determined.

The motion estimation unit 704 receives one input value 716 (e.g., the second input 510 described with respect to FIG. 5) representing an angular speed ($F_{Gyro}$) of an object detected using a gyroscope or other sensor. In an implementation, $F_{Gyro}$ is the normalized value (between 0 and 1) of the angular speed (input of the motion estimation unit). Processing is performed similar to that described with respect to the motion estimation unit 610 of the pipeline 600. In particular, the motion estimation unit 704 determines whether the input value 716 is higher than a threshold ($T_{Gyrospeed}$). If the input value 716 is higher than $T_{GyroSpeed}$, the motion estimation unit 704 determines that camera motion is detected.

However, if the input value 716 is not higher than $T_{Gyrospeed}$, a SAD is determined between two consecutive thumbnails (e.g., the current and the previous thumbnails). The SAD value is then normalized to produce normalized value $F_{Img}$. As such, if the input value 716 is lower than $T_{GyroSpeed}$, an output 718 of the motion estimation unit 704, $F_{Motion}$, is expressed as a fuzzy value representing $F_{Img}$. Otherwise, the output 718 is expressed as a fuzzy value representing $F_{Gyro}$.

The light intensity estimation unit 706 receives one input value 720 (e.g., the third input 512 described with respect to FIG. 5) representing a scene luminance estimated within exposure correction operations. Processing is performed similar to that described with respect to the light intensity estimation unit 616 of the pipeline 600. In particular, the input value 720 is compared against a threshold for light intensity. The input value 720 is then normalized to produce an output 722. The output 722 represents a fuzzy value of $F_{Lightintensity}$.

A mode selection unit 708 selects a camera mode to use to capture an image based on the fuzzy values included within the output 714, the output 718, and the output 722. First, the mode selection unit 708 fuzzifies the output 714, the output 718, and the output 722. For example, fuzzifying the output 714, the output 718, and the output 722 can include identifying each of the output 714, the output 718, and the output 722 as one of a small value, a medium value, or a large value (e.g., determining degrees of membership within those size categories). The mode selection unit 708 then evaluates the fuzzified values (expressed simply as "motion," "dynamic range," and "light intensity") in view of fuzzy inference rules. In some implementations, the fuzzy inference rules may be represented as a three-dimensional decision cube. For example, each of the three axes of the three-dimensional decision cube may represent one of motion, dynamic range, or light intensity.

Examples of the fuzzy inference rules include, without limitation: (1) if motion is small and dynamic range is small and light intensity is small, then mode is MFNR; (2) if motion is small and dynamic range is large and light intensity is small, then mode is MFNR; (3) if motion is small and dynamic range is small and light intensity is medium, then mode is MFNR; (4) if motion is small and dynamic range is large and light intensity is medium, then mode is HDR; (5) if motion is small and dynamic range is small and light intensity is large, then mode is STILL+LTM; (6) if motion is small and dynamic range is large and light intensity is large, then mode is HDR; (7) if motion is large and dynamic range is small and light intensity is small, then mode is STILL; (8) if motion is large and dynamic range is large and light intensity is small, then mode is STILL; (9) if motion is large and dynamic range is small and light intensity is medium, then mode is STILL+LTM; (10) if motion is large and dynamic range is large and light intensity is medium, then mode is STILL+LTM; (11) if motion is large and dynamic range is small and light intensity is large, then mode is STILL+LTM; and (12) if motion is large and dynamic range is large and light intensity is large, then mode is STILL+LTM.

Evaluating the fuzzified values using the fuzzy inference rules includes determining scores for each of the fuzzified values. For example, a small value of motion may have a score of X, where a large value of motion may have a score of Y. In another example, a small value of dynamic range may have a score of M, where a large value of dynamic range may have a score of N. In yet another example, a small value of light intensity may have a score of A, where a medium value of light intensity may have a score of B, and where a large value of light intensity may have a score of C. The scores for each of the three fuzzified values are multiplied to determine a score for a given one of the fuzzy inference rules.

The fuzzy inference rule associated with the highest resulting score may be selected. In some cases, there may be multiple fuzzy inference rules that correspond to a single camera mode. In such a case, the fuzzy inference rule having the highest score for that single camera mode is used instead of the other fuzzy inference rules. The mode selection unit 708 may then select the camera mode corresponding to the selected fuzzy inference rule.

The mode selection unit 708 then defuzzifies the fuzzy values used for the selected fuzzy inference rule. For example, defuzzifiying fuzzy values may include plotting a three-dimensional decision cube of those fuzzy values for tuning. For example, the mode selection unit 708 may include a temporal smoothing unit 724. The temporal smoothing unit 724 processes the fuzzy values corresponding to the selected fuzzy inference rule using temporal smoothing filtering, such as to avoid instabilities. For example, the temporal smoothing unit 724 can process given fuzzy values as $F_{i,t}$=alpha$_i$*$F_{i,t-1}$+(1-alpha$_i$)*$F_{i,t}$, where t means time or frame index and i means "Dark", "Bright", "Gyro", "Spatial", "Histo, and the like, for example. In some implementations, the temporal smoothing unit 724 may be external to the mode selection unit 708.

As a result, a selected camera mode 726 is selected. The selected camera mode 726 may then be used, such as by an image capture unit (e.g., the image capture unit 408 described with respect to FIG. 4), to capture an image.

Referring next to FIG. 8, a pipeline 800 used to implement a third technique for automated camera mode selection is shown. The third technique implemented using the pipeline 800 represents an extension of the second technique implemented using the pipeline 700 described with respect to FIG. 7. The third technique introduces spatial analysis for improving the output of the HDR estimation unit 702 and the use of exposure values for improving the output of the light intensity estimation unit 706. In particular, the third technique uses spatial information in addition to or in place of bright and dark pixel information for HDR detection.

The pipeline 800 includes an HDR estimation unit 802, a motion estimation unit 804, a light intensity estimation unit 806, and a mode selection unit 808 (which may, for example, be the HDR estimation unit 502, the motion estimation unit 504, and the light intensity estimation unit 506 described with respect to FIG. 5, and the mode selection unit 412 described with respect to FIG. 4). The output of each of the HDR estimation unit 802, the motion estimation unit 804, and the light intensity estimation unit 806 is expressed as a fuzzy value between 0.0 and 1.0.

According to the third technique, the HDR estimation unit 802 receives two input values 810 and 812 (e.g., the first input 508 described with respect to FIG. 5). Processing is performed similar to that described with respect to the HDR estimation unit 702 of the pipeline 700 described with respect to FIG. 7. In particular, the sum of dark pixels ($F_{Dark}$) is determined and the sum of bright pixels ($F_{Bright}$) is determined, using one or more dedicated weighting functions. The sums $F_{Dark}$ and $F_{Bright}$ are then normalized to determine an output 814 as a fuzzy value FHDR.

However, whereas other techniques for automated camera mode selection use the sums $F_{Dark}$ and $F_{Bright}$ to determine whether HDR is detected, the HDR estimation unit 802 further uses spatial information 816 for the dark pixels and for the bright pixels to detect HDR. For example, the HDR estimation unit 802 operates under the principle that a scene with HDR should have a difference of intensity between the center and the border of the scene (e.g., in backlight conditions). As such, the HDR estimation unit 802 uses the spatial information 816 to detect differences in the background and in the foreground of the scene. The spatial information 816 may include, for example, a saliency map or a similar mechanism.

The absolute difference between the average of the background and foreground regions of the scene can be normalized to detect HDR. For example, a value $F_{Histo}$ can be defined as the product of $F_{Dark}$ and $F_{Bright}$. Using the spatial analysis introduced within the HDR estimation unit 802, the output 814 ($F_{HDR}$) can be determined based on whether the spatial information 816 (e.g., backlight detection) is used along with or instead of the sums $F_{Dark}$ and $F_{Bright}$. For example, where the spatial information 816 is used along with the sums $F_{Dark}$ and $F_{Bright}$, the output 814 can be expressed as the product of $F_{Histo}$ and $F_{Spatial}$. In an implementation, $F_{Spatial}$ is the normalized value (between 0 and 1) of a pattern difference value, where a pattern is a small 3×3 matrix that is composed of black and white areas. This pattern is applied to the thumbnail to compute the difference between the white areas and the black areas. In another example, where the spatial information 816 is used instead of the sums $F_{Dark}$ and $F_{Bright}$, the output 814 can be expressed as the difference between a first value and a second value, where the first value is the sum of $F_{Histo}$ and $F_{Spatial}$ and where the second value is the product of $F_{Histo}$ and $F_{Spatial}$.

The motion estimation unit 804 receives one input value 818 (e.g., the second input 510 described with respect to FIG. 5). Processing is performed similar to that described with respect to the motion estimation unit 704 of the pipeline 700 described with respect to FIG. 7. In particular, the motion estimation unit 804 determines whether the input value 818 is higher than the threshold $T_{GyroSpeed}$. If the input value 818 is higher than $T_{GyroSpeed}$, the motion estimation unit 804 determines that camera motion is detected. However, if the input value 818 is not higher than $T_{GyroSpeed}$, a SAD is determined between two consecutive thumbnails (e.g., the current and the previous thumbnails). The SAD value is then normalized to produce normalized value $F_{Img}$. As such, if the input value 818 is lower than $T_{GyroSpeed}$, an output 820 of the motion estimation unit 804, $F_{Motion}$, is expressed as a fuzzy value representing $F_{Img}$. Otherwise, the output 820 is expressed as a fuzzy value representing $F_{Gyro}$.

The light intensity estimation unit 806 receives one input value 822 (e.g., the third input 512 described with respect to FIG. 5). Processing is performed similar to that described with respect to the light intensity estimation unit 706 of the pipeline 700 described with respect to FIG. 7. In particular, the input value 822 is compared against a threshold for light intensity. The input value 822 is then normalized to produce an output 824. The output 824 represents a fuzzy value of $F_{LightIntensity}$.

The mode selection unit 808 receives the output 814, the output 820, and the output 824. Processing is performed similar to that described with respect to the mode selection unit 708 of the pipeline 700 described with respect to FIG. 7. In particular, the mode selection unit 808 generally performs fuzzification against the output 814, the output 820, and the output 824, evaluates the fuzzy values thereof in view of rules, aggregates the output of those rules, and performs defuzzification against the aggregated output (e.g., using a temporal smoothing unit 826). In some implementations, the temporal smoothing unit 826 may be external to the mode selection unit 808. As a result, a selected camera mode 828 is selected. The selected camera mode 828 may then be used, such as by an image capture unit (e.g., the image capture unit 408 described with respect to FIG. 4), to capture an image.

Referring next to FIG. 9, a pipeline 900 used to implement a fourth technique for automated camera mode selection is shown. The fourth technique implemented using the pipeline 900 represents an extension of the first technique implemented using the pipeline 600 described with respect to FIG. 6. The fourth technique allows for the light intensity to be estimated using exposure values or camera ISO and further uses cuboids defined by tuning for the mode selection, such as instead of using fuzzy values.

In particular, the fourth technique uses parameter tuning to define the areas of activation for each camera mode within a three-dimensional decision cube. Values for each of the camera modes correspond to defined, non-overlapping three-dimensional regions within the three-dimensional decision cube. The three-dimensional decision cube may, for example, be the three-dimensional decision cube produced and used in connection with the second technique and/or the third technique, respectfully described above with respect to FIGS. 7 and 8.

The pipeline 900 includes an HDR estimation unit 902, a motion estimation unit 904, a light intensity estimation unit 906, a mode selection unit 908 (which may, for example, be the HDR estimation unit 502, the motion estimation unit 504, and the light intensity estimation unit 506 described with respect to FIG. 5, and the mode selection unit 412 described with respect to FIG. 4), and a parameter tuning unit 910.

According to the fourth technique, the HDR estimation unit 902 receives two input values 912 and 914 (e.g., the first input 508 described with respect to FIG. 5). Processing is performed similar to that described with respect to the HDR estimation unit 602 of the pipeline 600 described with respect to FIG. 6. In particular, the HDR estimation unit 902 determines whether a scene for the image to be captured is HDR based on where the two input values 912 and 914 are with respect to the weighting curves. The HDR estimation unit 902 outputs an output 916 as a result of that determination. The output 916 is a Boolean indicator in which a first value (e.g., true) indicates that the HDR estimation unit 902 determined the scene to be HDR and in which a second value (e.g., false) indicates that the HDR estimation unit 902 determined the scene to be non-HDR.

The motion estimation unit 904 receives one input value 918 (e.g., the second input 510 described with respect to FIG. 5). Processing is performed similar to that described with respect to the motion estimation unit 610 of the pipeline 600 described with respect to FIG. 6. In particular, the motion estimation unit 904 determines whether the input value 918 is higher than a first threshold. If the input value 918 is higher than the first threshold, the motion estimation unit 904 determines that camera motion is detected. If the input value 918 is not higher than the first threshold, a SAD is determined between the current and the previous thumbnails. If the SAD is higher than a second threshold, the motion estimation unit 904 determines that scene motion is detected. If the SAD is not higher than the second threshold, the motion estimation unit 904 determines that no motion is detected. The motion estimation unit 904 outputs an output 920, a Boolean indicator, as a result of the one or two determinations.

The light intensity estimation unit 906 receives one input value 922 (e.g., the third input 512 described with respect to FIG. 5). Processing is performed similar to that described with respect to the light intensity estimation unit 616 of the pipeline 600 described with respect to FIG. 6. In particular, the input value 922 represents a scene luminance estimated within exposure correction operations. The input value 922 is compared against a threshold for light intensity. If the input value 922 is greater than the threshold, the light intensity estimation unit 906 determines that the light intensity is high. If the input value 922 is less than the threshold, the light intensity estimation unit 906 determines that the light intensity is low. If the input value 922 is neither greater nor less than the threshold, the light intensity estimation unit 906 determines that the light intensity is medium.

The light intensity estimation unit 906 produces an output 924 to indicate the results of the comparison between the input value 922 and the threshold. However, whereas the input value for the light intensity estimation unit 616 of the pipeline 600 is an exposure value, the input value 922 may be an exposure value or an ISO value. As such, the light intensity estimation unit 906 may produce the output 924 based on comparisons between the described thresholds and the ISO value received as the input value 922.

The output 916, the output 920, and the output 924 may each be represented as a set of three values, each between 0.0 and 1.0. Those values correspond to a location within a three-dimensional region of the three-dimensional decision cube. The parameter tuning unit 910 receives the output 916, the output 920, and the output 924 and determines, based on the values included in each of those, the three-dimensional region of the three-dimensional decision cube to which the output 916, the output 920, and the output 924 correspond. Data indicative of that three-dimensional region is then passed to the mode selection unit 908, which selects the selected camera mode 926 as the camera mode that corresponds to that three-dimensional region. The selected camera mode 926 may then be used, such as by an image capture unit (e.g., the image capture unit 408 described with respect to FIG. 4), to capture an image.

The parameter tuning unit 910 is also used to update the three-dimensional decision cube used by the mode selection unit 908 to select the camera mode. That is, over time, the three-dimensional regions of the three-dimensional decision cube may change in size or position, such as based on the inputs received by the pipeline 900 (e.g., the input 402 described with respect to FIG. 4). The parameter tuning unit 910 processes these changes to update the three-dimensional decision cube accordingly.

In some implementations, the parameter tuning unit 910 may not be located before the mode selection unit 908 in the pipeline 900. For example, the mode selection unit 908 may directly receive the output 916, the output 920, and the output 924. The mode selection unit 908 may then use the parameter tuning unit 910 to identify the selected camera mode 926. For example, the mode selection unit 908 can send the three-dimensional index values of the output 916, the output 920, and the output 924 to the parameter tuning unit 910. The parameter tuning unit 910 may then to query the three-dimensional decision cube for the selected camera mode 926 according to those three-dimensional index values.

Referring next to FIG. 10, a pipeline 1000 used to implement a fifth technique for automated camera mode selection is shown. The fifth technique implemented using the pipeline 1000 represents an extension of the fourth technique implemented using the pipeline 900 described with respect to FIG. 9. The fifth technique improves the temporal smoothing filtering functionality of the automated camera mode selection process by further smoothing the output of the temporal smoothing. In particular, the fifth technique uses temporal smoothing filtering in addition to parameter tuning to select a camera mode based on output from processing units of the pipeline 1000.

The pipeline 1000 includes an HDR estimation unit 1002, a motion estimation unit 1004, a light intensity estimation unit 1006, a mode selection unit 1008 (which may, for example, be the HDR estimation unit 502, the motion estimation unit 504, and the light intensity estimation unit 506 described with respect to FIG. 5, and the mode selection unit 412 described with respect to FIG. 4), and a parameter tuning unit 1010 (which may, for example, be the parameter tuning unit 910 described with respect to FIG. 9).

According to the fifth technique, the HDR estimation unit 1002 receives two input values 1010 and 1012 (e.g., the first input 508 described with respect to FIG. 5). Processing is performed similar to that described with respect to the HDR estimation unit 602 of the pipeline 600 described with respect to FIG. 6. In particular, the HDR estimation unit 1002 determines whether a scene for the image to be captured is HDR based on where the two input values 1012 and 1014 are with respect to the weighting curves. The HDR estimation unit 1002 outputs an output 1016 as a result of that determination. The output 1016 is a Boolean indicator in which a first value (e.g., true) indicates that the HDR estimation unit 1002 determined the scene to be HDR and in which a second value (e.g., false) indicates that the HDR estimation unit 1002 determined the scene to be non-HDR.

The motion estimation unit 1004 receives one input value 1018 (e.g., the second input 510 described with respect to FIG. 5). Processing is performed similar to that described with respect to the motion estimation unit 610 of the pipeline 600 described with respect to FIG. 6. In particular, the motion estimation unit 1004 determines whether the input value 1018 is higher than a first threshold. If the input value 1018 is higher than the first threshold, the motion estimation unit 1004 determines that camera motion is detected. If the input value 1018 is not higher than the first threshold, a SAD is determined between the current and the previous thumbnails. If the SAD is higher than a second threshold, the motion estimation unit 1004 determines that scene motion is detected. If the SAD is not higher than the second threshold, the motion estimation unit 1004 determines that no motion is detected. The motion estimation unit 1004 outputs an output 1020, a Boolean indicator, as a result of the one or two determinations.

The light intensity estimation unit 1006 receives one input value 1022 (e.g., the third input 512 described with respect to FIG. 5). Processing is performed similar to that described with respect to the light intensity estimation unit 616 of the pipeline 600 described with respect to FIG. 6. In particular, the input value 1022 represents a scene luminance estimated within exposure correction operations. However, the input value 1022 may in some cases be an ISO value instead of an exposure value. The input value 1022 is compared against a threshold for light intensity. If the input value 1022 is greater than the threshold, the light intensity estimation unit 1006 determines that the light intensity is high. If the input value 1022 is less than the threshold, the light intensity estimation unit 1006 determines that the light intensity is low. If the input value 1022 is neither greater nor less than the threshold, the light intensity estimation unit 1006 determines that the light intensity is medium.

The output 1016, the output 1020, and the output 1024 may each be represented as a set of three values, each between 0.0 and 1.0. Those values correspond to a location within a three-dimensional region of the three-dimensional decision cube. The parameter tuning unit 1010 receives the output 1016, the output 1020, and the output 1024 and determines, based on the values included in each of those, the three-dimensional region of the three-dimensional decision cube to which the output 1016, the output 1020, and the output 1024 correspond. Data indicative of that three-dimensional region is then passed to the mode selection unit 1008.

The mode selection unit 1008 includes a temporal smoothing unit 1028 (e.g., the temporal smoothing unit 724 described with respect to FIG. 7). The temporal smoothing unit 1028 processes the values corresponding to the three-dimensional region using temporal smoothing filtering, such as to avoid instabilities. In some implementations, the temporal smoothing unit 1028 may be external to the mode selection unit 1008. The selected camera mode 1026 may then be used, such as by an image capture unit (e.g., the image capture unit 408 described with respect to FIG. 4), to capture an image.

However, in addition to the temporal smoothing filtering performed against the input to the mode selection unit 708, the temporal smoothing unit 1028 in the pipeline 1000 also performs temporal smoothing against the output. The temporal smoothing filtering on the output is a kind of median filtering on a window containing past values and works on the last N unsmoothed output, where N is between 1 and 20, to produce a smoothed output. The smoothed output represents the majority mode of the N values of the temporal smoothing filter window.

After a camera mode is selected, and after the search of the three-dimensional decision cube for the three-dimensional region, the selected camera mode 1026 is added to a buffer of previously unsmoothed camera modes of length N. A histogram of those N values is computer to select the camera mode therefrom having the greatest number of occurrences within those N values. That camera mode is the majority mode used as the smoothed value. In some cases, where two or more camera modes share the majority, the smoothed value is the previous smoothed value, such as to prevent oscillations.

In some implementations, the parameter tuning unit 1010 may also be used to update the three-dimensional decision cube used by the mode selection unit 1008 to select the camera mode. That is, over time, the three-dimensional regions of the three-dimensional decision cube may change in size or position, such as based on the inputs received by the pipeline 1000 (e.g., the input 402 described with respect to FIG. 4). The parameter tuning unit 1010 processes these changes to update the three-dimensional decision cube accordingly.

In some implementations, the parameter tuning unit 1010 may not be located before the mode selection unit 1008 in the pipeline 1000. For example, the mode selection unit 1008 may directly receive the output 1016, the output 1020, and the output 1024. The mode selection unit 1008 may then use the parameter tuning unit 1010 to identify the selected camera mode 1026. For example, the mode selection unit 1008 can send the three-dimensional index values of the output 1016, the output 1020, and the output 1024 to the parameter tuning unit 1010. The parameter tuning unit 1010 may then to query the three-dimensional decision cube for the selected camera mode 1026 according to those three-dimensional index values.

Referring next to FIG. 11, a pipeline 1100 used to implement a sixth technique for automated camera mode selection is shown. The sixth technique implemented using the pipeline 1100 represents an extension of the fifth technique implemented using the pipeline 1000 described with respect to FIG. 10. The sixth technique introduces tuning recommendations for use in the automated camera mode selection process. In particular, the sixth technique introduces tuning recommendations for face scores of 0.0 to 1.0 for local tone mapping.

The pipeline 1100 includes an HDR estimation unit 1102, a motion estimation unit 1104, a light intensity estimation unit 1106, and a mode selection unit 1108 (which may, for example, be the HDR estimation unit 502, the motion estimation unit 504, and the light intensity estimation unit 506 described with respect to FIG. 5, and the mode selection unit 412 described with respect to FIG. 4).

According to the sixth technique, the HDR estimation unit 1102 receives two input values 1110 and 1112 (e.g., the first input 508 described with respect to FIG. 5). Processing is performed similar to that described with respect to the HDR estimation unit 602 of the pipeline 600 described with respect to FIG. 6. In particular, the HDR estimation unit 1102 determines whether a scene for the image to be captured is HDR based on where the two input values 1112 and 1114 are with respect to the weighting curves. The HDR estimation unit 1102 outputs an output 1116 as a result of that determination. The output 1116 is a Boolean indicator in which a first value (e.g., true) indicates that the HDR estimation unit 1102 determined the scene to be HDR and in which a second value (e.g., false) indicates that the HDR estimation unit 1102 determined the scene to be non-HDR.

The motion estimation unit 1104 receives one input value 1118 (e.g., the second input 510 described with respect to FIG. 5). Processing is performed similar to that described with respect to the motion estimation unit 610 of the pipeline 600 described with respect to FIG. 6. In particular, the motion estimation unit 1104 determines whether the input value 1118 is higher than a first threshold. If the input value 1118 is higher than the first threshold, the motion estimation unit 1104 determines that camera motion is detected. If the input value 1118 is not higher than the first threshold, a SAD is determined between the current and the previous thumbnails. If the SAD is higher than a second threshold, the motion estimation unit 1104 determines that scene motion is detected. If the SAD is not higher than the second threshold, the motion estimation unit 1104 determines that no motion is detected. The motion estimation unit 1104 outputs an output 1120, a Boolean indicator, as a result of the one or two determinations.

The light intensity estimation unit 1106 receives one input value 1122 (e.g., the third input 512 described with respect to FIG. 5). Processing is performed similar to that described with respect to the light intensity estimation unit 616 of the pipeline 600 described with respect to FIG. 6. In particular, the input value 1122 represents a scene luminance estimated within exposure correction operations. However, the input value 1122 may in some cases be an ISO value instead of an exposure value. The input value 1122 is compared against a threshold for light intensity. If the input value 1122 is greater than the threshold, the light intensity estimation unit 1106 determines that the light intensity is high. If the input value 1122 is less than the threshold, the light intensity estimation unit 1106 determines that the light intensity is low. If the input value 1122 is neither greater nor less than the threshold, the light intensity estimation unit 1106 determines that the light intensity is medium.

The output 1116, the output 1120, and the output 1124 may each be represented as a set of three values, each between 0.0 and 1.0. Those values correspond to a location within a three-dimensional region of the three-dimensional decision cube. The parameter tuning unit 1110 receives the output 1116, the output 1120, and the output 1124 and determines, based on the values included in each of those, the three-dimensional region of the three-dimensional decision cube to which the output 1116, the output 1120, and the output 1124 correspond. Data indicative of that three-dimensional region is then passed to the mode selection unit 1108.

The mode selection unit 1108 includes a temporal smoothing unit 1128 (e.g., the temporal smoothing unit 724 described with respect to FIG. 7). The temporal smoothing unit 1128 processes the values corresponding to the three-dimensional region using temporal smoothing filtering, such as to avoid instabilities. The temporal smoothing unit 1128 also performs temporal smoothing against the output, such as described above with respect to the temporal smoothing unit 1028 of FIG. 10. In some implementations, the temporal smoothing unit 1128 may be external to the mode selection unit 1108. The selected camera mode 1126 may then be used, such as by an image capture unit (e.g., the image capture unit 408 described with respect to FIG. 4), to capture an image.

The mode selection unit 1108 also outputs tuning recommendations 1130. The tuning recommendations 1130 are based on face scores for LTM. A face score is a value from 0.0 to 1.0 and indicates whether there are faces in an image to capture or not. That is, LTM should adapt tuning where a face score is 1.0 indicating that a big face is in the image, but LTM may not need to adapt tuning where the face score is 0.0 indicating no face in the image or a face too small or too out of focus. Where the tuning recommendations 1130 reflect a higher value, the area of the face can be normalized by a display window, such as to provide a more robust zoom and field of view (e.g., wide versus linear) function. A smoothing operation may also be performed on the tuning recommendations 1130 to avoid oscillations due to face detection instabilities. For example, the smoothing operation may be expressed as faceScoreSmoothed=alpha*previousFaceScoreSmoothed+(1−alpha)*currentFaceScore.

Figure 12:
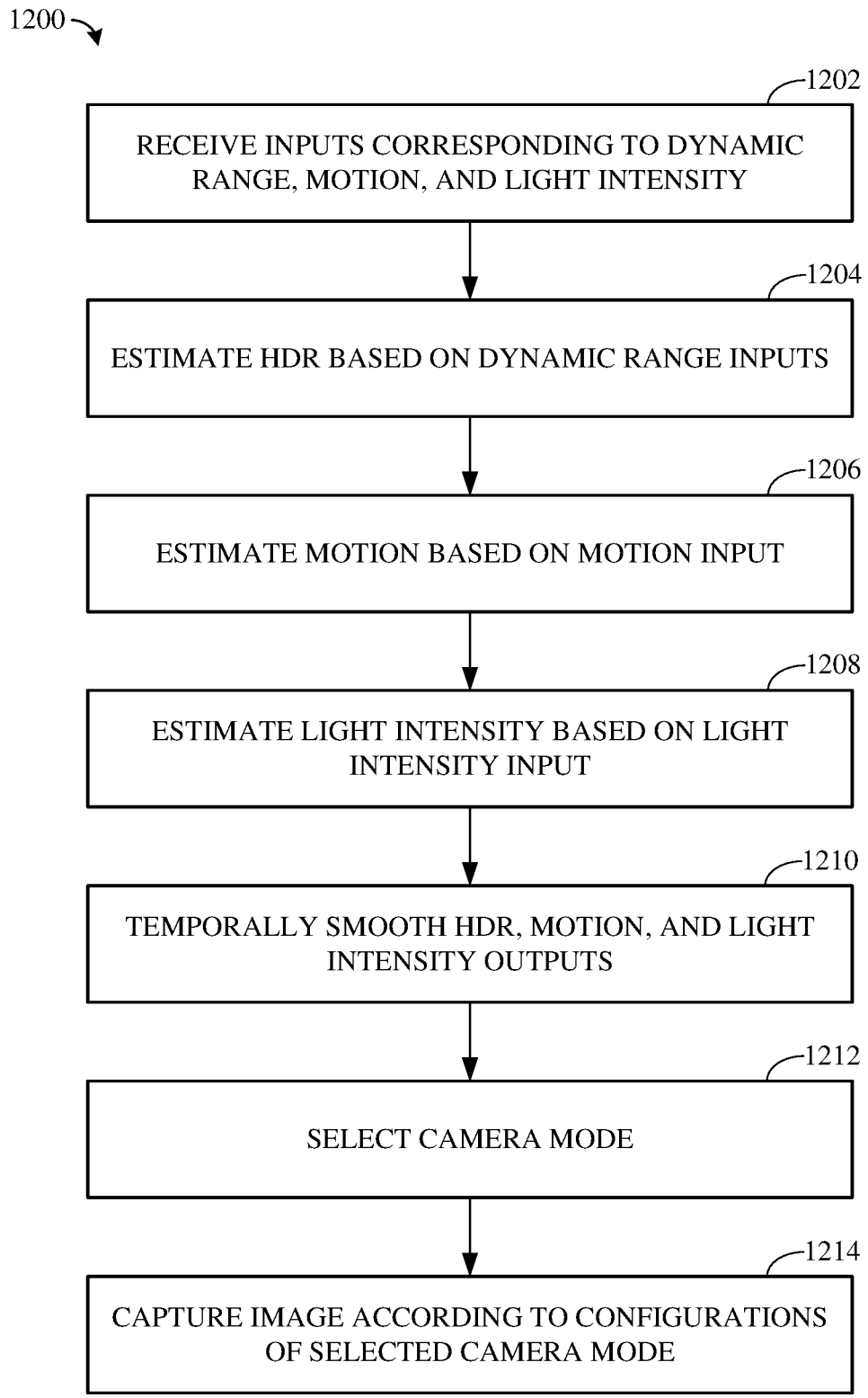
FIG. 12 is a flowchart showing an example of a technique for automated camera mode selection.

Further details of implementations and examples of techniques performed using the systems and pipelines described with respect to FIGS. 1-11 are now described. FIG. 12 is a flowchart showing an example of a technique 1200 for automated camera mode selection. The technique 1200 can be performed, for example, using hardware and/or software components of an image capture system, such as the image capture device 100 shown in FIGS. 1A-D or the image capture device 200 shown in FIG. 2. For example, the image capture device 100 or the image capture device 200 may include one or more software components that process an image captured using an image capture device of the image capture device 100 or the image capture device 200, for example, to perform automated camera mode selection, such as described in one or more of the pipeline 400, the pipeline 600, the pipeline 700, the pipeline 800, the pipeline 900, the pipeline 1000, or the pipeline 1100.

In another example, the technique 1200 can be performed using an integrated circuit. The integrated circuit may, for example, be a field programmable gate array (e.g., FPGA), programmable logic device (PLD), reconfigurable computer fabric (RCF), system on a chip (SoC), ASICs, and/or another type of integrated circuit. An image processor of the integrated circuit includes a camera mode selection unit and/or an image capture unit (e.g., a processor having one or multiple cores) configured to execute instructions to perform some or all of the technique 1200.

Although the technique 1200 is described with respect to a series of operations, the operations comprising the technique 1200 may be performed in orders other than those described herein. In some implementations, the technique 1200 may include additional, fewer, or different operations than those described herein.

At 1202, inputs corresponding to dynamic range, motion, and light intensity are received. At 1204, HDR is estimated based on the dynamic range inputs. Estimating the HDR based on the dynamic range inputs can include using control points of curves for LUTs to compare values of dark and bright pixels to one or more thresholds. At 1206, motion is estimated based on the motion input. Estimating the motion can include comparing an angular speed measured with respect to the motion input to one or more thresholds. At 1208, light intensity is estimated based on the light intensity input. Estimating the light intensity can include comparing measurements of the scene luminance for the image to capture to one or more thresholds.

At 1210, the HDR, motion, and light intensity outputs are temporally smoothed. Temporally smoothing the HDR, motion, and light intensity outputs can include using those outputs to identify a three-dimensional region of a three-dimensional decision cube. For example, the HDR, motion, and light intensity outputs may each be expressed as a set of values indicating a three-dimensional coordinate location. That location can be identified within a three-dimensional region of the three-dimensional decision cube.

At 1212, a camera mode is selected. Selecting the camera mode can include identifying a camera mode corresponding to the three-dimensional region of the three-dimensional decision cube identified by the temporal smoothing. At 1214, the selected camera mode is used to capture an image. Capturing an image using the selected camera mode can include adjusting settings of an image capture device according to configurations of the selected camera mode.

Some or all of the technique 1200 may repeat continuously until user input indicating to capture the image is received. For example, a processor or image capture device implementing the technique 1200 may continuously perform the operations for estimating the HDR, motion, and/or light intensity and/or for performing temporal smoothing until user input indicating to capture the image is received. The user input may, for example, be represented by a user of a device configured for capturing the image interacting with an interface element of the device (e.g., a physical button or a portion of a touch screen).

In some implementations, the technique 1200 can include selecting the same camera mode for capturing a second image. For example, subsequent to capturing the image using the selected camera mode, user input indicating to capture a second image may be received (e.g., by the user interacting with an interface element to capture the second image). Based on aspects of the scene of the image or a time at which the image was captured, the same camera mode may be selected for capturing the second image.

For example, where the scene of the captured image is similar (e.g., based on a threshold value) to a scene of the second image to capture, the same camera mode can be selected. In another example, where the user input indicating to capture the second image is received within a threshold amount of time (e.g., 1 second) after the first image is captured, the same camera mode can be selected. Selecting the same camera mode in either of these ways prevents additional resources from being spent to determine a camera mode to use when not much has changed since the most recent camera mode selection.

In some implementations, the technique 1200 can include determining that the scene of the image to capture is dark and selecting a dark setting camera mode in response. For example, one or more of the inputs for the dynamic range, motion, or light intensity may indicate that the image is to be captured during night time or otherwise in a dark area. In such an implementation, an auto-night camera mode may be selected. Selecting the auto-night camera mode may include bypassing or otherwise ignoring aspects of the technique 1200 that would otherwise be used for selecting a camera mode, for example, the temporal smoothing.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A method for automated camera mode selection, the method comprising:
   determining dynamic range conditions in a scene based on intensity;
   detecting motion presence within the scene;
   automatically selecting a camera mode based on a combination of the determined dynamic range conditions and the detected motion associated with the scene;
   buffering the selected camera mode;
   determining a smoothed camera mode based on buffered unsmoothed selected camera modes to mitigate camera mode oscillations; and
   detecting an image using the smoothed camera mode.

2. The method of claim 1, further comprising:
   temporally smoothing the buffered unsmoothed selected camera modes.

3. The method of claim 2, further comprising:
   temporal smoothing the determined dynamic range conditions and the detected motion associated with the scene.

4. The method of claim 2, wherein the smoothed camera mode is a camera mode with greatest number of occurrences.

5. The method of claim 4, wherein the smoothed camera mode is a last smoothed camera mode when at least two camera modes share the greatest number of occurrences.

6. The method of claim 5, wherein the motion is one of camera motion or scene motion.

7. The method of claim 1, wherein the determining dynamic range conditions further comprises:
   determining differences in the intensity between a center and a border of the scene.

8. The method of claim 1, wherein the determining dynamic range conditions further comprises:
   using spatial information to determine differences in the intensity in a background and in a foreground of the scene.

9. The method of claim 8, wherein the spatial information is determined from dark pixels and bright pixels in the scene.

10. The method of claim 1, the method further comprising:
    outputting a tuning recommendation based on local tone mapping for a face in the scene, the tuning recommendation associated with a zoom and field of view for the image capture device.

11. An image capture device for automated camera mode selection, the image capture device comprising:

a dynamic range estimation unit configured to determine dynamic range conditions in a scene based on intensity;

a motion estimation unit configured to detect motion associated with the scene based on one or more motion inputs;

a mode selection unit configured to select a camera mode based on a combination of the determined dynamic range conditions and the detected motion associated with the scene;

a buffer configured to store the selected camera mode;

a temporal smoothing unit configured to determine a smoothed camera mode based on buffered unsmoothed selected camera modes to mitigate camera mode oscillations; and an image sensor configured to detect an image of the scene according to the smoothed camera mode.

12. The image capture device of claim 11, further comprising:

the temporal smoothing unit configured to smooth the buffered unsmoothed selected camera modes.

13. The image capture device of claim 12, further comprising:

another temporal smoothing unit configured to perform temporal smoothing filtering against outputs from the dynamic range estimation unit and from the motion estimation unit.

14. The image capture device of claim 12, wherein the smoothed camera mode is a camera mode with greatest number of occurrences.

15. The image capture device of claim 14, wherein the smoothed camera mode is a last smooth camera mode when at least two camera modes share the greatest number of occurrences.

16. The image capture device of claim 15, wherein the motion is one of camera motion or scene motion.

17. The image capture device of claim 11, wherein the dynamic range estimation unit is further configured to determine differences in the intensity between a center and a border of the scene.

18. The image capture device of claim 11, wherein the dynamic range estimation unit is further configured to use spatial information to determine differences in the intensity in a background and in a foreground of the scene.

19. The image capture device of claim 18, wherein the spatial information is determined from dark pixels and bright pixels in the scene.

20. An imaging system comprising:

a processor, the processor configured to:

determine dynamic range conditions in a scene based on intensity;

detect motion presence within the scene;

automatically select a camera mode based on a combination of the determined dynamic range conditions and the detected motion associated with the scene;

store the selected camera mode in a buffer;

determine a smoothed camera mode based on buffered unsmoothed selected camera modes to mitigate camera mode oscillations; and an image sensor coupled to the processor, the image sensor configured detect an image using the smoothed camera mode.

* * * * *